United States Patent
Kim et al.

(10) Patent No.: US 11,853,219 B2
(45) Date of Patent: Dec. 26, 2023

(54) STORAGE CONTROLLER HAVING DATA PREFETCHING CONTROL FUNCTION, OPERATING METHOD OF STORAGE CONTROLLER, AND OPERATING METHOD OF STORAGE DEVICE

(71) Applicant: SAMSUNG ELECTRONICS CO., LTD., Suwon-si (KR)

(72) Inventors: Minwoo Kim, Hwaseong-si (KR); Daekyu Park, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 11 days.

(21) Appl. No.: 17/496,028

(22) Filed: Oct. 7, 2021

(65) Prior Publication Data
US 2022/0261349 A1    Aug. 18, 2022

(30) Foreign Application Priority Data
Feb. 17, 2021    (KR) .......................... 10-2021-0021451

(51) Int. Cl.
G06F 12/0862    (2016.01)

(52) U.S. Cl.
CPC .... *G06F 12/0862* (2013.01); *G06F 2212/602* (2013.01)

(58) Field of Classification Search
CPC ....................................................... G06F 3/06
See application file for complete search history.

(56) References Cited

U.S. PATENT DOCUMENTS

| | | | |
|---|---|---|---|
| 5,983,306 A | 11/1999 | Corrigan et al. | |
| 6,381,677 B1* | 4/2002 | Beardsley | G06F 12/0862 |
| | | | 711/136 |
| 7,774,550 B2* | 8/2010 | Nomura | G06F 12/0862 |
| | | | 711/137 |
| 7,917,702 B2 | 3/2011 | Morrow et al. | |
| 8,364,901 B2 | 1/2013 | Jeddeloh | |
| 8,607,002 B2 | 12/2013 | Jeddeloh | |
| 9,043,579 B2 | 5/2015 | Heisch | |
| 9,058,277 B2 | 6/2015 | Bade et al. | |
| 9,471,510 B2 | 10/2016 | Susarla et al. | |
| 9,547,459 B1* | 1/2017 | BenHanokh | G06F 3/065 |
| 10,001,927 B1* | 6/2018 | Trachtman | G06F 3/0688 |
| 10,146,448 B2* | 12/2018 | Kotte | G06F 3/0616 |
| 2006/0031635 A1* | 2/2006 | Zohar | G06F 12/0866 |
| | | | 711/E12.019 |

(Continued)

*Primary Examiner* — William E. Baughman
(74) *Attorney, Agent, or Firm* — F. Chau & Associates, LLC

(57) ABSTRACT

A storage controller includes a prefetch buffer configured to buffer data prefetched from a non-volatile memory during a prefetch operation, a determiner circuit configured to output one of the prefetched data and normal data read from the non-volatile memory, as read data, and a prefetch control circuit configured to enable the prefetch operation during a first time when a sequential read operation is performed on the non-volatile memory, disable the prefetch operation at a second point after the first time, and enable the prefetch operation or maintain the disable of the prefetch operation according to performance of the read data in a prefetch suspend period after the second time in which the prefetch operation is disabled.

20 Claims, 18 Drawing Sheets

(56) References Cited

U.S. PATENT DOCUMENTS

| | | | |
|---|---|---|---|
| 2006/0161736 A1* | 7/2006 | Huang | G06F 12/0862 |
| | | | 711/137 |
| 2006/0174228 A1* | 8/2006 | Radhakrishnan | G06F 9/30047 |
| | | | 712/E9.055 |
| 2008/0183903 A1* | 7/2008 | VanStee | G06F 13/161 |
| | | | 710/5 |
| 2011/0113199 A1* | 5/2011 | Tang | G06F 15/8069 |
| | | | 711/143 |
| 2013/0179632 A1* | 7/2013 | Ben-Shemesh | G06F 12/0862 |
| | | | 711/E12.002 |
| 2014/0108740 A1* | 4/2014 | Rafacz | G06F 12/0862 |
| | | | 711/137 |
| 2019/0294546 A1* | 9/2019 | Agarwal | G06F 12/0846 |
| 2020/0065247 A1* | 2/2020 | Choudhary | G06F 12/0862 |
| 2020/0327060 A1* | 10/2020 | Desai | G06F 12/0868 |
| 2021/0149805 A1* | 5/2021 | Pinho | G06N 20/10 |
| 2021/0240621 A1* | 8/2021 | Fu | G06F 12/084 |

* cited by examiner

STORAGE CONTROLLER HAVING DATA PREFETCHING CONTROL FUNCTION, OPERATING METHOD OF STORAGE CONTROLLER, AND OPERATING METHOD OF STORAGE DEVICE

CROSS-REFERENCE TO RELATED APPLICATION

This non-provisional U.S. patent application claims priority under 35 U.S.C. § 119 to Korean Patent Application No. 10-2021-0021451, filed on Feb. 17, 2021, in the Korean Intellectual Property Office, the disclosure of which is incorporated by reference in its entirety herein.

1. TECHNICAL FIELD

The inventive concept relates to a storage device, and more particularly, to a storage controller having a data prefetch control function, an operating method of the storage controller, and an operating method of a storage device.

2. DISCUSSION OF RELATED ART

Non-volatile memory is a type of memory that can retain stored information even after power is removed. Examples of non-volatile memory include flash memory, read-only memory (ROM), ferroelectric random-access memory (F-RAM), and magnetoresistive random-access memory (MRAM).

A storage system includes a host and a storage device. The storage device may include, for example, a non-volatile memory such as a flash memory and a storage controller for controlling the non-volatile memory. The storage device may provide data stored in the non-volatile memory to the host according to a read request from the host. When read requests for consecutive addresses are received from the host, the storage device may perform a sequential read operation on the non-volatile memory.

The storage controller may improve read performance by prefetching data from the non-volatile memory. However, the prefetching may consume a large amount of power.

SUMMARY

At least one embodiment of the inventive concept provides a storage controller having a prefetch control function for improving data read performance, an operating method of the storage controller, and an operating method of a storage device.

According to an embodiment of the inventive concept, there is provided a storage controller configured to control a non-volatile memory. The storage controller includes: a prefetch buffer, a determiner circuit, and a prefetch control circuit. The prefetch buffer is configured to buffer data prefetched from the non-volatile memory during a prefetch operation. The determiner circuit is configured to output one of the prefetched data and normal data read from the non-volatile memory, as read data. The prefetch control circuit is configured to enable the prefetch operation during a first time when a sequential read operation is performed on the non-volatile memory, disable the prefetch operation at a second time after the first time, and enable the prefetch operation or maintain the disable of the prefetch operation according to performance of the read data in a prefetch suspend period after the first time in which the prefetch operation is disabled.

According to an embodiment of the inventive concept, there is provided an operating method of a storage controller controlling a non-volatile memory. The operating method includes: buffering data prefetched from the non-volatile memory in a prefetch buffer based on a sequential read command received from a host, outputting data buffered in the prefetch buffer at a first time, outputting data read from the non-volatile memory at a second time after the first time, and outputting data of the prefetch buffer or normal data read from non-volatile memory as read data at a third time after the second time based on performance of the read data.

According to an embodiment of the inventive concept, there is provided an operating method of a storage device including a non-volatile memory and a storage controller. The operating method includes: transmitting a prefetch command from the storage controller to the non-volatile memory based on a sequential read command received from a host, buffering prefetched data received from the non-volatile memory in a prefetch buffer in response to the prefetch command, transmitting the prefetched data buffered in the prefetch buffer from the storage controller to the host during a first time based on the sequential read command, transmitting normal data received from the non-volatile memory, instead of the prefetched data, from the storage controller to the host when a second time after the first time, transmitting the normal data from the storage controller to the host when a read performance of the normal data is greater than a first threshold, and transmitting the prefetched data from the storage controller to the host when the read performance of the normal data is less than or equal to the first threshold.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Hereinafter, embodiments of the inventive concept will be described in detail with reference to the accompanying drawings.

Figure 1:
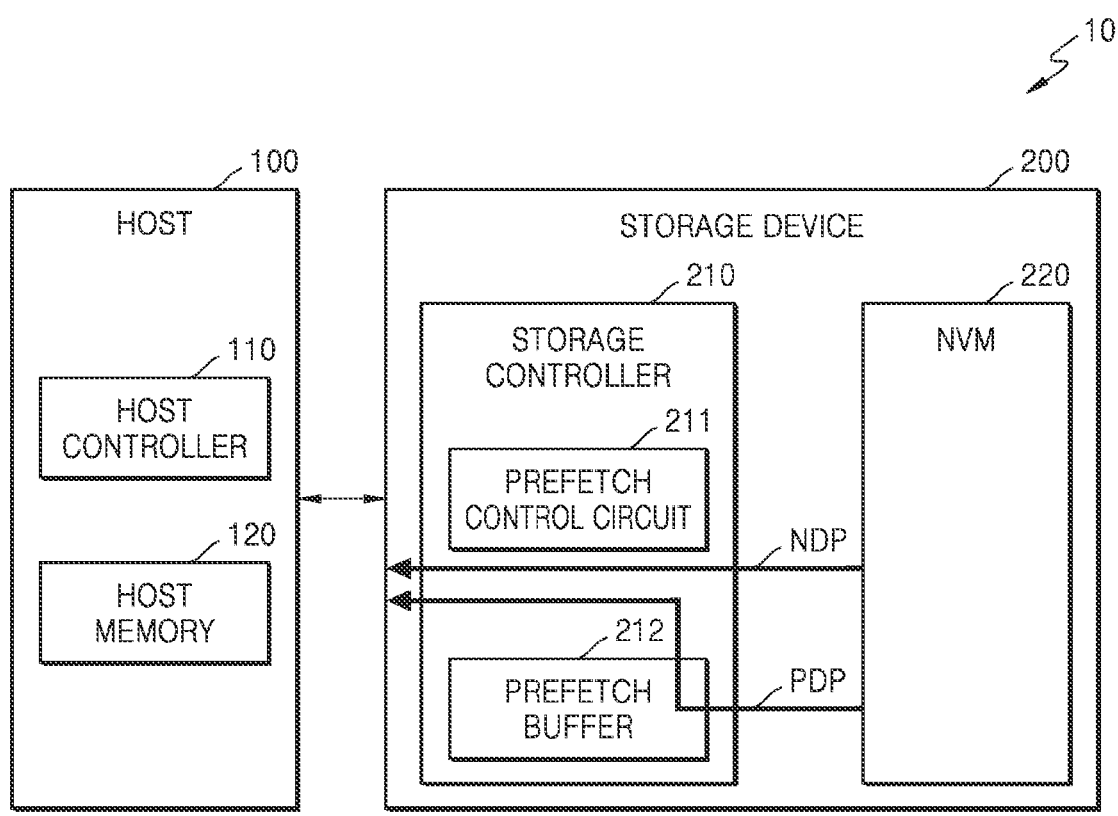
FIG. 1 is a schematic block diagram of a storage system according to an embodiment of the inventive concept.

FIG. 1 is a schematic block diagram of a storage system 10 according to an embodiment of the inventive concept.

Referring to FIG. 1, the storage system 10 includes a host 100 (e.g., host device) and a storage device 200. The storage device 200 includes a storage controller 210 (e.g., a control circuit) and a non-volatile memory (NVM) 220. According to an embodiment, the storage controller 210 may also be referred to as a controller, a device controller, or a memory controller. According to an embodiment, the NVM 220 may be implemented with a plurality of memory chips or a plurality of memory dies. For example, each of the plurality of memory chips may be a dual die package (DDP), a quadruple die package (QDP), or an octuple die package (ODP). The host 100 may include a host controller 110 and a host memory 120. The host memory 120 may function as a buffer memory for temporarily storing data to be transmitted to the storage device 200 or data transmitted from the storage device 200.

The storage device 200 may include storage media for storing data according to a request from the host 100. As an example, the storage device 200 may include at least one of a solid state drive (SSD), an embedded memory, and a detachable external memory. When the storage device 200 is an SSD, the storage device 200 may be a device conforming to non-volatile memory express (NVMe) standards. When the storage device 200 is an embedded memory or an external memory, the storage device 200 may be a device conforming to universal flash storage (UFS) or embedded multi-media card (eMMC) standards. The host 100 and the storage device 200 may each generate and transmit a packet according to an adopted standard protocol.

When the NVM 220 of the storage device 200 includes a flash memory, the flash memory may include a 2D NAND memory array or a 3D (or vertical) NAND (VNAND) memory array. As another example, the storage device 200 may include various other types of non-volatile memories. For example, magnetic RAM (MRAM), spin-transfer torque MRAM, conductive bridging RAM (CBRAM), ferroelectric RAM (FeRAM), phase RAM (PRAM), resistive RAM (RRAM), and various other types of memory may be applied to the storage device 200.

The storage controller 210 may control the NVM 220 to write data to the NVM 220 in response to a write request from the host 100 or may control the NVM 220 to read data stored in the NVM 220 in response to a read request from the host 100. According to the present embodiment, the storage controller 210 includes a prefetch control circuit 211 and a prefetch buffer 212. However, the inventive concept is not limited thereto, and in some embodiments, the prefetch buffer 212 may be disposed outside the storage controller 210.

The prefetch control circuit 211 may dynamically control a data prefetching operation during a sequential read operation of the NVM 220. The "sequential read operation" refers to read operations corresponding to consecutive addresses. For example, when the storage controller 210 receives a first read command and a first address from the host 100 and then receives a second read command and a second address from the host 100, a start point of the second address may correspond to a logical block address (LBA) immediately after the last LBA of the first address. In this case, the storage controller 210 may determine that a read operation corresponding to the first and second read commands is a sequential read operation. The "data prefetching operation" is an operation of reading from the NVM 220 in advance data corresponding to a read command and an address that have not yet been received from the host 100 and buffering the data in the prefetch buffer 212. During a sequential read operation, data read performance may be improved through a data prefetching operation.

Specifically, the prefetch control circuit 211 may dynamically control the data prefetching operation during a sequential read operation, and thus may dynamically select a transfer path of data, which is provided from the NVM 220 to the host 100, as a normal data path NDP or a prefetched data path PDP. The "normal data path NDP" may correspond to a path that transfers data transmitted from the NVM 220 to the host 100 in response to a read command and an address, received from the host 100. The "prefetched data path PDP" may correspond to a path that transfers data transmitted from the NVM 220 to the prefetch buffer 212 and then from the prefetch buffer 212 to the host 100 in response to a prefetch command generated by the storage controller 210. For example, if the storage device 200 receives a first read command and a first address from the host 100, the prefetch control circuit 211 may prefetch data from the NVM 220 located at a second address corresponding to a logical block address (LBA) immediately after the last LBA of the first address. According to an embodiment, the storage device 200 may include a plurality of data signal lines, respectively corresponding to a plurality of data signals or a plurality of data input/output signals, between the NVM 220 and the storage controller 210. In case of the normal data path NDP, the NVM 200 may transmit normal data to the storage controller 210 via the plurality of data signals. In case of the prefetched data path PDP, the NVM 200 may transmit prefetched data to the storage controller 210 via the plurality of data signals.

Figure 2:
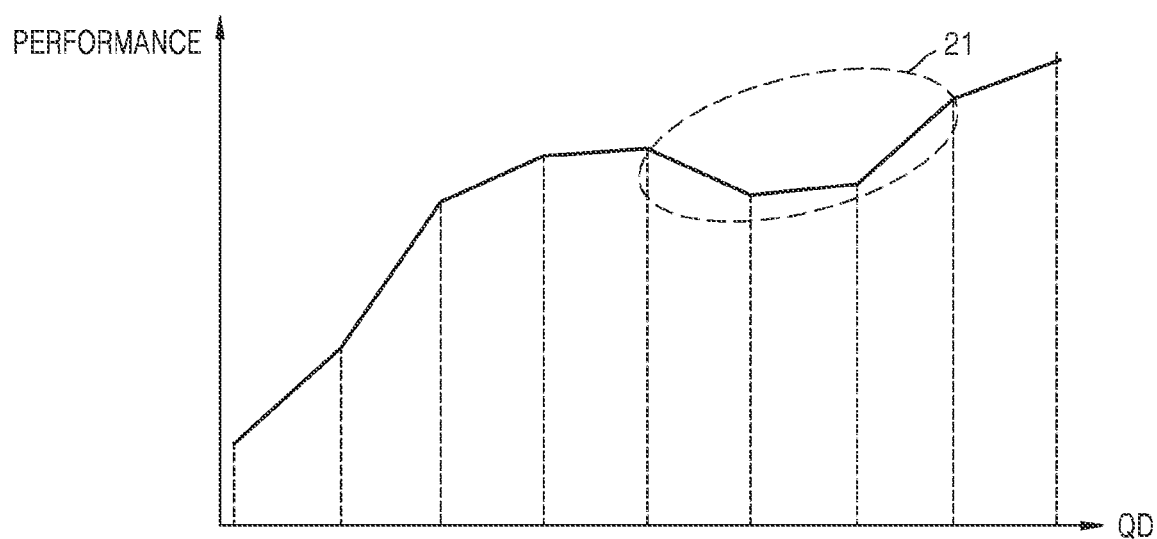
FIG. 2 illustrates sequential read performance according to queuing depth (QD) when a prefetching operation is enabled in a storage device according to an embodiment of the inventive concept.

FIG. 2 illustrates sequential read performance according to queuing depth (QD) when a prefetching operation is enabled in the storage device 200 according to an embodiment of the inventive concept.

Referring to FIGS. 1 and 2, the horizontal axis represents QD, and the vertical axis represents read performance. The QD may represent the number of input/output (I/O) requests that are simultaneously waiting in the storage controller 210. The read performance may represent the size of read data transmitted from the storage device 200 to the host 100 during a unit time, and may be expressed in megabytes per second (MB/s), but is not limited thereto. For example, when first read data of a first size is transmitted from the storage device 200 to the host 100 during a first period of certain duration and second read data of a second larger size is transmitted from the storage device 200 to the host 100 during a second period of the same duration, the read performance of the storage device 200 is higher during the second period than during the first period. In an embodiment, during a sequential read operation, the read performance of the storage device 200 may be improved by enabling a prefetching operation. As the size of the read data increases or the QD increases, the read performance should linearly increase by enabling the prefetching operation. However, in practice, when the prefetching operation is enabled, the read performance may be lowered when data has a certain data size or when in a certain QD section 21.

According to the present embodiment, the prefetch control circuit 211 controls a data prefetching operation by dynamically enabling or disabling the prefetching operation based on the performance (e.g., read performance) of read data transmitted from the storage device 200 to the host 100. Specifically, during a sequential read operation, the prefetch control circuit 211 may determine, as a default mode, a prefetch enable mode for enabling the prefetching operation, and may periodically disable the prefetching operation based on a certain condition. In this embodiment, the prefetch control circuit 211 may maintain a prefetch suspend mode or terminate the prefetch suspend mode and resume the prefetching operation, according to read performance in the prefetch suspend mode in which the prefetching operation is disabled.

Figure 3:
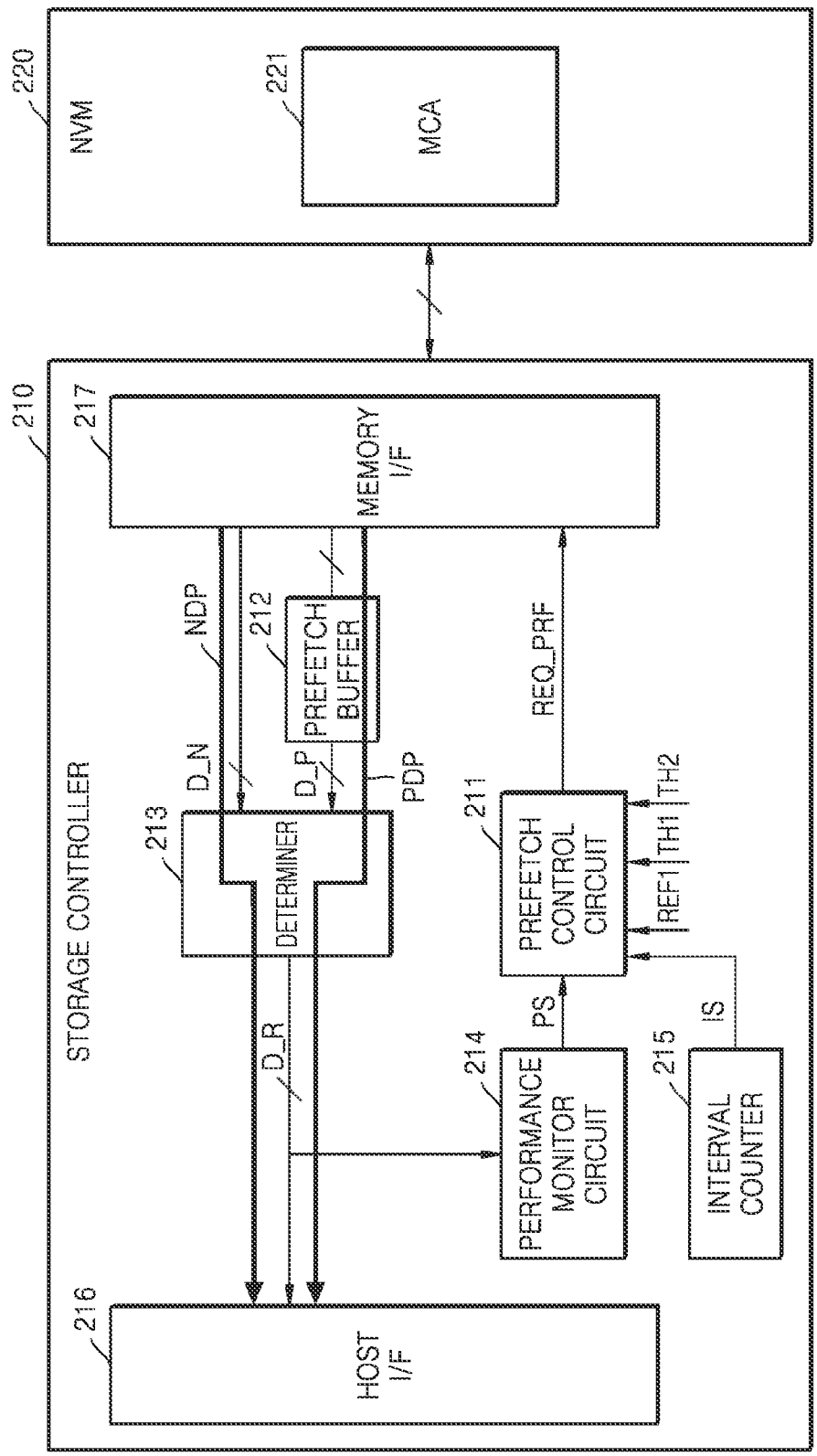
FIG. 3 illustrates a storage device in FIG. 1, according to an embodiment of the inventive concept.

FIG. 3 illustrates the storage device 200 in FIG. 1, according to an embodiment of the inventive concept.

Referring to FIGS. 1 and 3, the storage controller 210 includes a prefetch control circuit 211, a prefetch buffer 212, a determiner 213 (e.g., a determiner circuit), a performance monitor circuit 214, an interval counter 215 (e.g., a counter circuit), a host interface (I/F) 216 (e.g., an interface circuit), and a memory I/F 217. For example, the prefetch control circuit 211, the performance monitor circuit 214, and the interval counter 215 may be implemented by hardware. However, the inventive concept is not limited thereto, and at least one of the prefetch control circuit 211, the performance monitor circuit 214, and the interval counter 215 may be implemented by software or firmware. Descriptions given above with reference to FIGS. 1 and 2 may also be applied to the present embodiment, and redundant descriptions thereof are omitted.

The host I/F 216 (e.g., an interface circuit) may transmit a packet to the host 100 and receive a packet from the host 100. For example, a packet transmitted from the host 100 to the host I/F 216 may include a read command, and a packet transmitted from the host I/F 216 to the host 100 may include data read from the NVM 220. In an embodiment, the host interface 216 may sequentially receive a plurality of packets from the host 100, and each of the plurality of packets may include a read command and an address. For example, the storage controller 210 may determine the read command as a sequential read command or a random read command according to addresses in each of the plurality of packets.

In an embodiment, when it is determined that the read command is a sequential read command, the storage controller 210 enables a prefetch function or a prefetch operation of the prefetch control circuit 211. In an embodiment, when the number of consecutive read commands is greater than a first reference value REF1, the storage controller 210 may determine the read command as a sequential read command, and when the number of consecutive read commands is not greater than the first reference value REF1, the storage controller 210 may determine the read command as a random read command. For example, the first reference value REF1 may correspond to 2, and the storage controller 210 may determine the read command as a sequential read command when the number of consecutive read commands is greater than 2. For example, when the number of consecutive read commands is 3, the storage controller 210 may determine that each of the three commands are sequential read commands.

In an embodiment, when the storage controller 210 receives a first read command and a first address from the host 100 and then receives a second read command and a second address, the storage controller 210 may determine the first and second read commands as sequential read commands or random read commands according to the first and second addresses. For example, when the first address and the second address are consecutive addresses, the storage controller 210 may determine the first and second read commands as sequential read commands. In an embodiment, the storage controller 210 receives a command set including a read command and a flag defining a sequential read command from the host 100. In this embodiment, the storage controller 210 determines a received read command as a sequential read command. For example, the flag may be set to indicate that a read command is a sequential read command or is not a sequential read command.

In an embodiment, when the read command is determined to be a sequential read command, the prefetch control circuit 211 enables a prefetch function or a prefetch operation and provides a prefetch request signal REQ_PRF to the memory I/F 217. For example, when the read command is determined to be a sequential read command, the prefetch control circuit 211 may enable a prefetch operation and may provide the prefetch request signal REQ_PRF to the memory I/F 217. For example, when the read command is determined to be a random read command, the prefetch control circuit 211 disables the prefetch operation and does not provide the prefetch request signal REQ_PRF to the memory I/F 217. In an embodiment, the prefetch request signal REQ_PRF is always provided to the memory I/F 217 and has one of two logical states to indicate whether to enable or disable the prefetch operation.

In an embodiment, the prefetch control circuit 211 provides the prefetch request signal REQ_PRF to the memory I/F 217 during a read operation of the NVM 220 in response to a read command received from the host 100 or while read data is received from the NVM 220. In an embodiment, the prefetch control circuit 211 provides a next prefetch request signal REQ_PRF to the memory I/F 217 during a prefetch operation of the NVM 220 in response to a previous prefetch request signal REQ_PRF or while prefetched data is received from the NVM 220.

The memory I/F 217 may transmit data to be written to the NVM 220 to the NVM 220 or may receive data read from the memory cell array 221 of the NVM 220. The memory I/F 217 may be implemented to comply with a standard convention such as a toggle or an open NAND flash interface (ONFI). The memory I/F 217 may be connected to the NVM 220 through a plurality of data lines or a plurality of I/O lines. For example, the plurality of data lines or the plurality of I/O lines may correspond to one channel. For example, the number of data lines may be eight, but the inventive concept is not limited thereto.

In an embodiment, the memory I/F 217 generates a read command from a read command received from the host 100 and transmits the generated read command to the NVM 220. For example, the memory I/F 217 may transmit a read command to the NVM 220 through a plurality of data lines. Also, the memory I/F 217 may receive data from the NVM 220 through a plurality of data lines. In this case, data received in response to the read command may be referred to as "normal data D_N".

In an embodiment, the memory I/F 217 generates a prefetch command in response to the prefetch request signal REQ_PRF received from the prefetch control circuit 211, and transmits the generated prefetch command to the NVM 220. For example, the memory I/F 217 may transmit a prefetch command to the NVM 220 through a plurality of data lines. Also, the memory I/F 217 may receive data from the NVM 220 through a plurality of data lines. In this case, data received from the NVM 220 in response to the prefetch request signal REQ_PRF or the prefetch command may be referred to as "prefetched data D_P".

The prefetch buffer 212 may buffer prefetched data D_P prefetched from the NVM 220. The determiner 213 may select, as read data D_R, one of the normal data D_N received from the memory I/F 217 and the prefetched data D_P received from the prefetch buffer 212, and may provide selected read data D_R to the host I/F 216. For example, when the address of a sequential read command, that is, the logical block address (LBA) of the sequential read command, corresponds to the address of prefetched data D_P buffered in the prefetch buffer 212, that is, the LBA of the prefetched data D_P, the determiner 213 selects the prefetched data D_P as the read data D_R. For example, when the LBA of the sequential read command does not correspond to the LBA of the prefetched data D_P buffered in the prefetch buffer 212, the determiner 213 may select the normal data D_N as the read data D_R.

In an embodiment, the performance monitor circuit 214 generates a performance signal PS by monitoring the performance of the read data D_R transmitted from the determiner 213 to the host I/F 216, and may provide the generated performance signal PS to the prefetch control circuit 211 in real time. The performance signal PS may correspond to read performance, and the read performance may correspond to the size of the read data D_R provided per unit time. In an embodiment, the read performance is proportional to the size of the read data_R provided per unit time.

In an embodiment, the interval counter 215 generates an interval signal IS every predefined period, and provides the generated interval signal TS to the prefetch control circuit 211. For example, the interval counter 215 may count the number of clocks (or pulses) from a clock signal, and may activate the interval signal IS when the counted number of clocks corresponds to a predefined period. For example, the interval signal IS may be generated as a pulse signal. According to an embodiment, the interval counter 215 may be referred to as a timer or an interval timer.

When it is determined that the read command is a sequential read command, the prefetch control circuit 211 may generate a prefetch request signal REQ_PRF. In the present embodiment, the prefetch control circuit 211 may generate a prefetch request signal REQ_PRF having an enable level during a sequential read operation, and accordingly, may determine a prefetch enable mode as a default mode.

The prefetch control circuit 211 may generate a prefetch request signal REQ_PRF in response to the interval signal IS received from the interval counter 215. For example, the prefetch control circuit 211 may sample the performance signal PS periodically based on the interval signal IS. In an embodiment, in response to the interval signal IS received from the interval counter 215, the prefetch control circuit 211 generates the prefetch request signal REQ_PRF having an enable level when the performance signal PS is less than or equal to a first threshold TH1. In an embodiment, in response to the interval signal IS received from the interval counter 215, the prefetch control circuit 211 generates the prefetch request signal REQ_PRF having a disable level when the performance signal PS is greater than the first threshold TH1. The determiner 213 may select the prefetched data D_P buffered in the prefetch buffer 212 and output the prefetched data D_P as the read data D_R.

Figure 4:
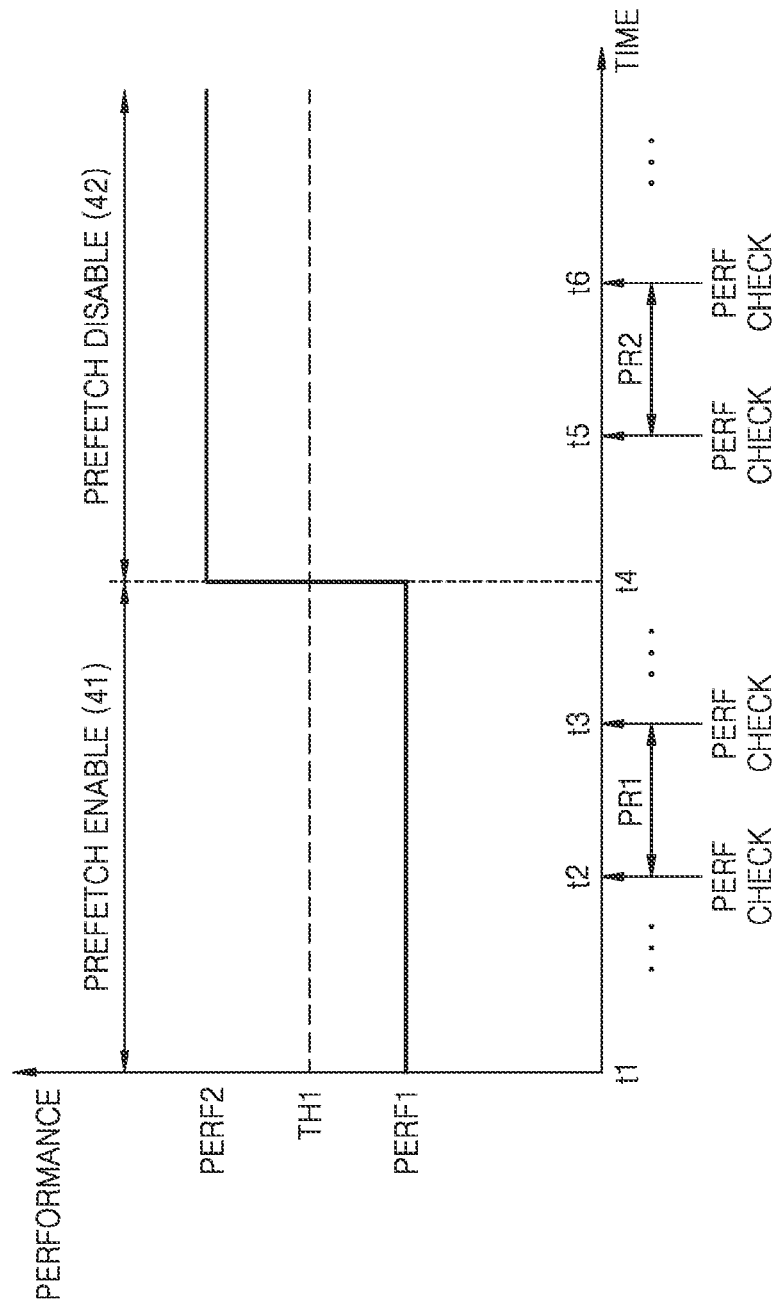
FIG. 4 is a graph illustrating the read performance of a storage device over time, according to an embodiment of the inventive concept.

FIG. 4 is a graph illustrating the read performance of the storage device 200 over time, according to an embodiment of the inventive concept.

Referring to FIG. 4, the horizontal axis represents time, and the vertical axis represents read performance. For example, the read performance may correspond to the performance signal PS generated by the performance monitor circuit 214 of FIG. 3. Hereinafter, a prefetch control operation of the storage device 200 will be described with reference to FIGS. 3 and 4.

A prefetch enable period 41 represents a period in which a prefetch operation is enabled, and a prefetch disable period 42 represents a period in which the prefetch operation is disabled. For example, the prefetch enable period 41 may correspond to a time period from time t1 to time t4, and the prefetch disable period 42 may correspond to a time period from time t4. During a sequential read operation, the prefetch control circuit 211 determines the prefetch request signal REQ_PRF to have an enable level that is a default level. In an embodiment, when the performance signal PS is greater than the first threshold TH1, the prefetch control circuit 211 changes the prefetch request signal REQ_PRF from the enable level to a disable level.

In an embodiment, the prefetch control circuit 211 periodically suspends the prefetch request signal REQ_PRF according to the interval signal IS. When the interval signal IS is activated, the prefetch control circuit 211 may set the prefetch request signal REQ_PRF to have a disable level, and accordingly, a prefetch mode may be changed from a prefetch enable mode to a prefetch suspend mode. Accordingly, the determiner 213 may select normal data D_N received from the memory I/F 217 and output the normal data D_N as the read data D_R.

At time t2, when the interval signal IS is activated, the prefetch control circuit 211 may generate the prefetch request signal REQ_PRF at a disable level and compare the performance signal PS with the first threshold TH1. As a result of the comparison, when the performance signal PS is not greater than the first threshold TH1, the prefetch control circuit 211 may terminate the prefetch suspend mode and change the prefetch request signal REQ_PRF from a disable level to an enable level. Accordingly, the determiner 213 may output the prefetched data D_P.

At time t3, when the interval signal IS is activated, the prefetch control circuit 211 may generate the prefetch request signal REQ_PRF at a disable level and compare the performance signal PS with the first threshold TH1. In this case, a time interval between time t2 and time t3 may correspond to a first period PR1, and the interval counter 215 may activate the interval signal IS every first period PR1. As described above, in the prefetch enable period 41, the prefetch control circuit 211 may generate the prefetch request signal REQ_PRF to have a disable level every first period PR1 and compare the performance signal PS with the first threshold TH1. As a result of the comparison, when the performance signal PS is greater than the first threshold TH1, the prefetch control circuit 211 may enter the prefetch disable period 42.

At time t4, the prefetch control circuit 211 may generate the prefetch request signal REQ_PRF having a disable level, and the determiner 213 may output normal data D_N. In the prefetch disable period 42, the prefetch control circuit 211 may compare the performance signal PS with the first threshold TH1 every second period PR2. The prefetch control circuit 211 may compare the performance signal PS with the first threshold TH1 at time t5 and time t6. In this case, a time interval between time t5 and time t6 may correspond to the second period PR2, and the interval counter 215 may activate the interval signal IS every second period PR2. For example, the first period PR1 may be equal to the second period PR2. However, the inventive concept is not limited thereto, and the first period PR1 may be different from the second period PR2.

As a result of the comparison, when the performance signal PS is greater than the first threshold TH1, the prefetch control circuit 211 may maintain the prefetch disable period 42. On the other hand, as a result of the comparison, when the performance signal PS is not greater than the first threshold TH1, the prefetch control circuit 211 may change the prefetch mode to the prefetch enable mode, and may generate the prefetch request signal REQ_PRF at an enable level. In this case, the determiner 213 may output prefetched data D_P.

In an embodiment, the prefetch control circuit 211 periodically compares the performance signal PS with a second threshold TH2 (see FIG. 9) in the prefetch enable period 41. The second threshold TH2 may be less than the first threshold TH1. As a result of the comparison, when the performance signal PS is greater than the second threshold TH2, the prefetch control circuit 211 may periodically suspend the prefetch operation. In other words, the prefetch control circuit 211 may periodically suspend the prefetch operation from a point in time when the performance signal PS is greater than the second threshold TH2. This will be described in more detail with reference to FIGS. 8 and 9.

Figure 5:
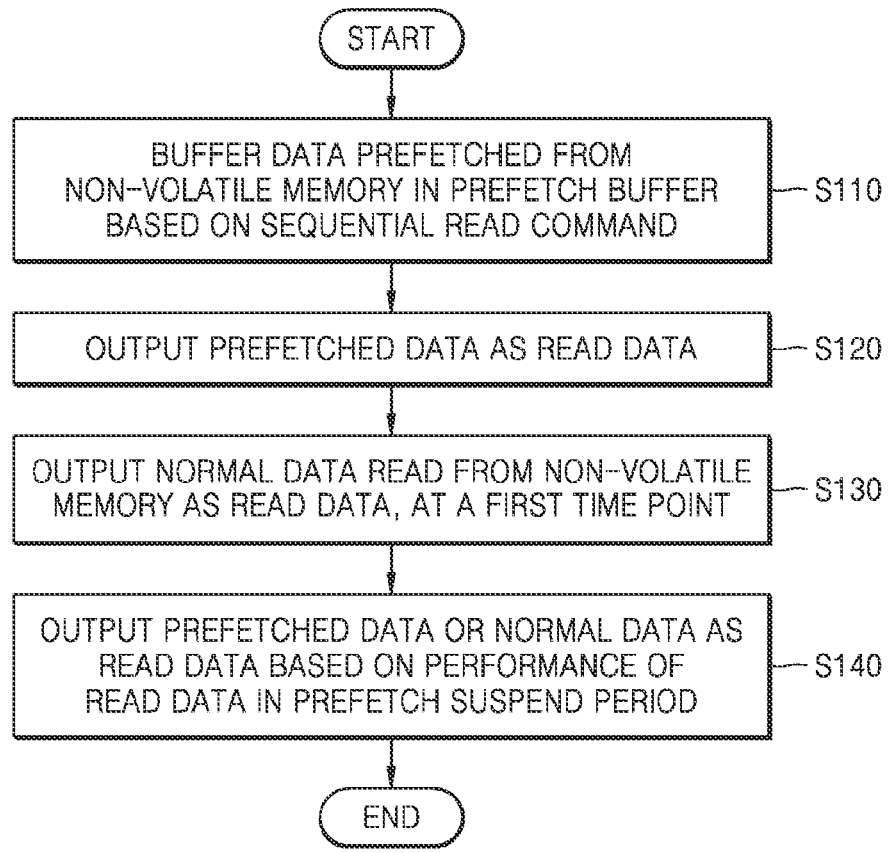
FIG. 5 is a flowchart illustrating an operating method of a storage controller according to an embodiment of the inventive concept.

FIG. 5 is a flowchart illustrating an operating method of a storage controller according to an embodiment of the inventive concept.

Referring to FIG. 5, the operating method of the storage controller according to the present embodiment is a method in which the storage controller controls a data prefetching operation when a sequential read operation is performed on a non-volatile memory. For example, the operating method may be performed by the storage controller 210 in FIG. 3. Hereinafter, the operating method will be described with reference to FIGS. 1, 3, and 5.

In operation S110, the storage controller 210 buffers prefetched data D_P prefetched from the NVM 220 in the prefetch buffer 212 based on a sequential read command. In operation S120, during a sequential read operation on the NVM 220, the storage controller 210 outputs the prefetched data D_P as read data D_R. In operation S130, the storage controller 210 outputs normal data D_N read from the NVM 220 as read data D_R, at a first time point. In operation S140, the storage controller 210 outputs prefetched data D_P or normal data D_N as read data D_R based on the performance of the read data D_R in a prefetch suspend period.

Figure 6:
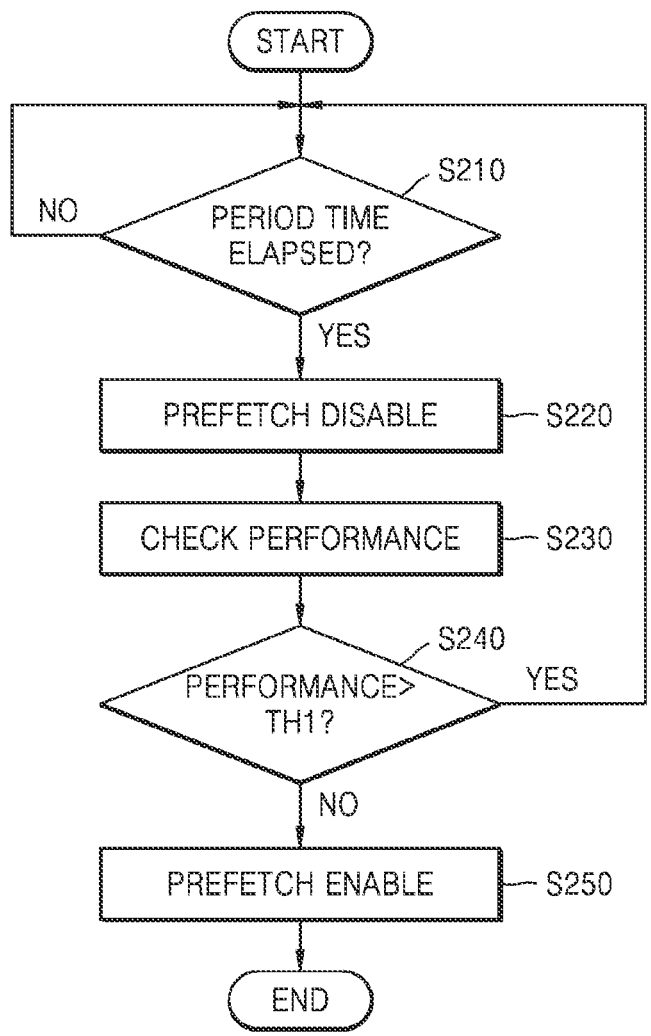
FIG. 6 is a flowchart illustrating a prefetch control method of a storage controller according to an embodiment of the inventive concept.

FIG. 6 is a flowchart illustrating a prefetch control method of a storage controller according to an embodiment of the inventive concept.

Referring to FIG. 6, the prefetch control method of the storage controller according to the present embodiment may correspond to an implementation example of operations S130 and S140 of FIG. 5. For example, the prefetch control method may include time-series operations performed by the prefetch control circuit 211 of FIG. 3. Hereinafter, the prefetch control method will be described with reference to FIGS. 3 to 6. For example, operation S210 may be performed after operation S120 of FIG. 5.

In operation S210, the storage controller 210 determines whether a predetermined period of time has elapsed. For example, the predetermined period time may correspond to the first period PR1 of FIG. 4. In an embodiment, the storage controller 210 may determine whether a certain period of time has elapsed from a point in time when the storage controller 210 enters the prefetch enable period 41. In an embodiment, after entering the prefetch enable period 41, the storage controller 210 determines whether a certain period of time has elapsed from a point in time when the performance signal PS is greater than the second threshold TH2.

As a result of the determination, when the certain period of time elapses, in operation S220, the storage controller 210 generates a prefetch request signal REQ_PRF having a disable level and disables a data prefetching operation. Accordingly, the determiner 213 outputs the normal data D_N as read data D_R. In operation S230, the storage controller 210 checks the performance of the read data D_R, that is, the performance of the normal data D_N. In operation S240, the storage controller 210 determines whether the performance is greater than the first threshold TH1. As a result of the determination, when the performance is not greater than the first threshold TH1, the storage controller 210 generates a prefetch request signal REQ_PRF having an enable level and enables the data prefetching operation.

Figure 7:
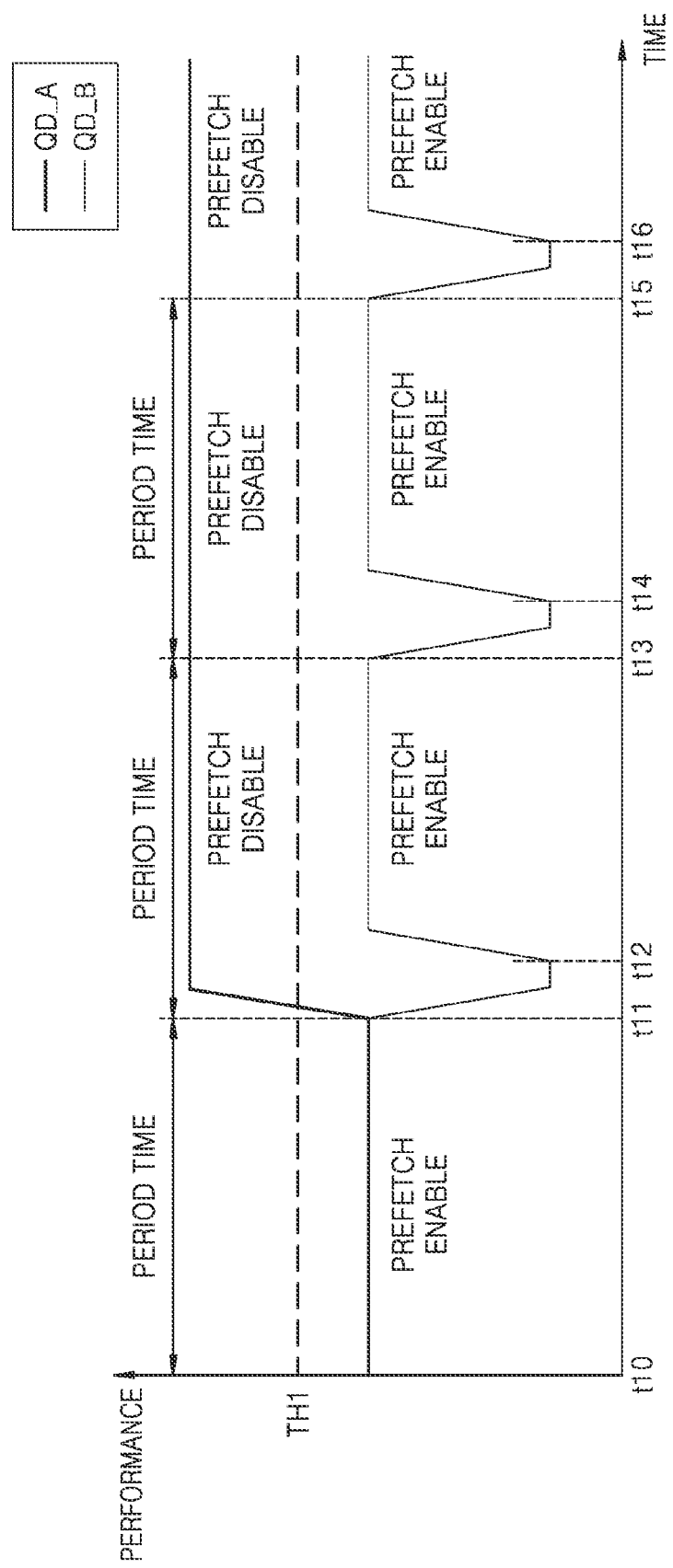
FIG. 7 is a graph illustrating a prefetch control operation of FIG. 6, according to an embodiment of the inventive concept.

FIG. 7 is a graph illustrating a prefetch control operation of FIG. 6, according to an embodiment of the inventive concept.

Referring to FIG. 7, the horizontal axis represents time and the vertical axis represents performance. In FIG. 7, read performance in a first QD QD_A and read performance in a second QD QD_B are illustrated. The first QD QD_A and the second QD QD_B may correspond to different arbitrary QDs. Hereinafter, the prefetch control operation will be described with reference to FIGS. 3, 6 and 7.

In the case of the first QD QD_A, in a period from time t10 to time t11, the prefetch request signal REQ_PRF has an enable level. For example, the period from time t10 to time t11 may correspond to a predetermined period (e.g., the first period PR1 of FIG. 4). At time t11, the prefetch control circuit 211 changes the level of the prefetch request signal REQ_PRF to a disable level, and the determiner 213 outputs the normal data D_N as the read data D_R. Thereafter, at time t12, the prefetch control circuit 211 checks the read performance of the read data D_R, that is, the performance signal PS.

When the performance signal PS is greater than the first threshold TH1, the prefetch control circuit 211 maintains the prefetch request signal REQ_PRF at a disable level. Subsequently, at times t13 and t15, the prefetch request signal REQ_PRF is at a disable level, and the determiner 213 outputs the normal data D_N as the read data D_R. In this case, at times t14 and t16, the prefetch control circuit 211 checks the read performance of the read data D_R, that is, the performance signal PS. For example, a period from time t11 to time t13 and a period from time t13 to time t15 may correspond to a predetermined period (e.g., the second period PR2 of FIG. 4).

In the case of the second QD QD_B, in the period from time t10 to time t11, the prefetch request signal REQ_PRF has an enable level. For example, the period from time t10 to time t11 may correspond to a predetermined period. At time t11, the prefetch control circuit 211 changes the level of the prefetch request signal REQ_PRF to a disable level, and the determiner 213 outputs the normal data D_N as the read data D_R. In this case, the prefetch control circuit 211 checks the read performance of the read data D_R, that is, the performance signal PS.

When the performance signal PS is not greater than the first threshold TH1, at time t12, the prefetch control circuit 211 changes the level of the prefetch request signal REQ_PRF to an enable level, and the determiner 213 outputs the prefetched data D_P as the read data D_R. Subsequently, at time t13, the prefetch control circuit 211 changes the level of the prefetch request signal REQ_PRF to a disable level, and the determiner 213 outputs the normal data D_N as the read data D_R. In this case, the prefetch control circuit 211 checks the read performance of the read data D_R, that is, the performance signal PS. When the performance signal PS is not greater than the first threshold TH1, at time t14, the prefetch control circuit 211 changes the level of the prefetch request signal REQ_PRF to an enable level, and the determiner 213 outputs the prefetched data D_P as the read data D_R.

Figure 8:
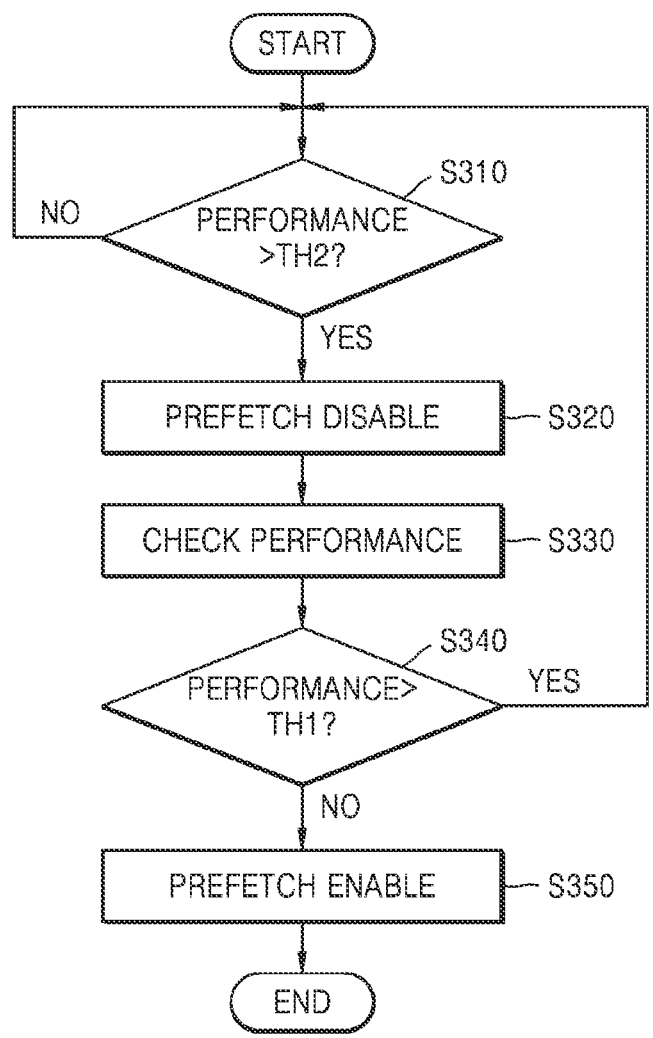
FIG. 8 is a flowchart illustrating a prefetch control method of a storage controller according to an embodiment of the inventive concept.

FIG. 8 is a flowchart illustrating a prefetch control method of a storage controller according to an embodiment of the inventive concept.

Referring to FIG. 8, the prefetch control method of the storage controller according to the present embodiment may correspond to an implementation example of operations S130 and S140 of FIG. 5. For example, the prefetch control method may include time-series operations performed by the prefetch control circuit 211 of FIG. 3. Hereinafter, the prefetch control method will be described with reference to FIGS. 3 and 8. For example, operation S310 may be performed after operation S120 of FIG. 5.

In operation S310, the storage controller 210 determines whether the read performance is greater than the second threshold TH2. In an embodiment, the storage controller 210 may periodically determine whether the read performance is greater than the second threshold TH2. For example, the storage controller 210 may periodically compare the read performance with the second threshold TH2 from a point in time when the storage controller 210 enters the prefetch enable period 41.

As a result of the determination, when the read performance is greater than the second threshold TH2, in operation S320, the storage controller 210 generates a prefetch request signal REQ_PRF having a disable level and disables a data prefetching operation. Accordingly, the determiner 213 outputs the normal data D_N as read data D_R. In operation S330, the storage controller 210 checks the performance of the read data D_R, that is, the performance of the normal data D_N. In operation S340, the storage controller 210 determines whether the performance is greater than the first threshold TH1. As a result of the determination, when the performance is not greater than the first threshold TH1, the storage controller 210 generates a prefetch request signal REQ_PRF having an enable level and enables the data prefetching operation. If the performance is greater than the first threshold TH1, the method may resume to operation S310. In an embodiment, the second threshold TH2 is lower than the first threshold TH1.

Figure 9:
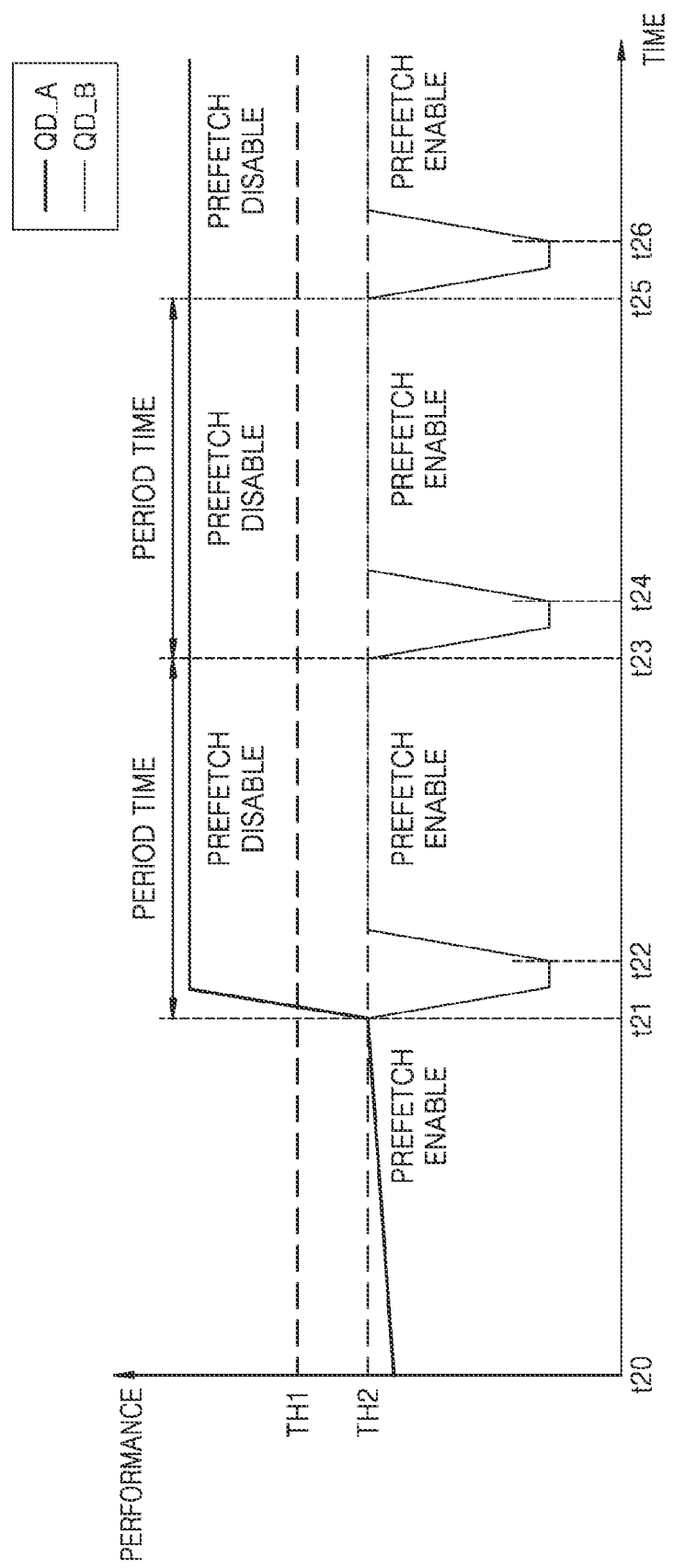
FIG. 9 is a graph illustrating a prefetch control operation of FIG. 8, according to an embodiment of the inventive concept.

FIG. 9 is a graph illustrating a prefetch control operation of FIG. 8, according to an embodiment of the inventive concept.

Referring to FIG. 9, the horizontal axis represents time and the vertical axis represents performance. In FIG. 9, read performance in the first QD QD_A and read performance in the second QD QD_B are illustrated. The first QD QD_A and the second QD QD_B may correspond to different arbitrary QDs. Hereinafter, the prefetch control operation will be described with reference to FIGS. 3, 8, and 9 together.

In the case of the first QD QD_A, in a period from time t20 to time t21, the prefetch request signal REQ_PRF has an enable level, and the prefetch control circuit 211 may periodically compare the read performance with the second threshold TH2. At time t21, when the read performance is greater than the second threshold TH2, the prefetch control circuit 211 changes the level of the prefetch request signal REQ_PRF to a disable level, and the determiner 213 outputs the normal data D_N as the read data D_R. In this case, the prefetch control circuit 211 may check the read performance of the read data D_R, that is, the performance signal PS.

When the performance signal PS is greater than the first threshold TH1, the prefetch control circuit 211 may maintain the prefetch request signal REQ_PRF at a disable level. Subsequently, at times t23 and t25, the prefetch request signal REQ_PRF has a disable level, and the determiner 213 outputs the normal data D_N as the read data D_R. In this case, at times t24 and t26, the prefetch control circuit 211 checks the read performance of the read data D_R, that is, the performance signal PS. For example, a period from time t21 to time t23 and a period from time t23 to time t25 may correspond to a predetermined period.

In the case of the second QD QD_B, in the period from time t20 to time t21, the prefetch request signal REQ_PRF has an enable level, and the prefetch control circuit 211 periodically compares the read performance with the second threshold TH2. At time t21, when the read performance is greater than the second threshold TH2, the prefetch control circuit 211 changes the level of the prefetch request signal REQ_PRF to a disable level, and the determiner 213 outputs the normal data D_N as the read data D_R. In this case, the prefetch control circuit 211 checks the read performance of the read data D_R, that is, the performance signal PS.

When the performance signal PS is not greater than the first threshold TH1, at time t22, the prefetch control circuit 211 changes the level of the prefetch request signal REQ_PRF to an enable level, and the determiner 213 outputs the prefetched data D_P as the read data D_R. Subsequently, at time t23, the prefetch control circuit 211 changes the level of the prefetch request signal REQ_PRF to a disable level, and the determiner 213 outputs the normal data D_N as the read data D_R. In this case, at time t24, the prefetch control circuit 211 checks the read performance of the read data D_R, that is, the performance signal PS. When the performance signal PS is not greater than the first threshold TH1, the prefetch control circuit 211 changes the level of the prefetch request signal REQ_PRF to an enable level, and the determiner 213 outputs the prefetched data D_P as the read data D_R.

Figure 10:
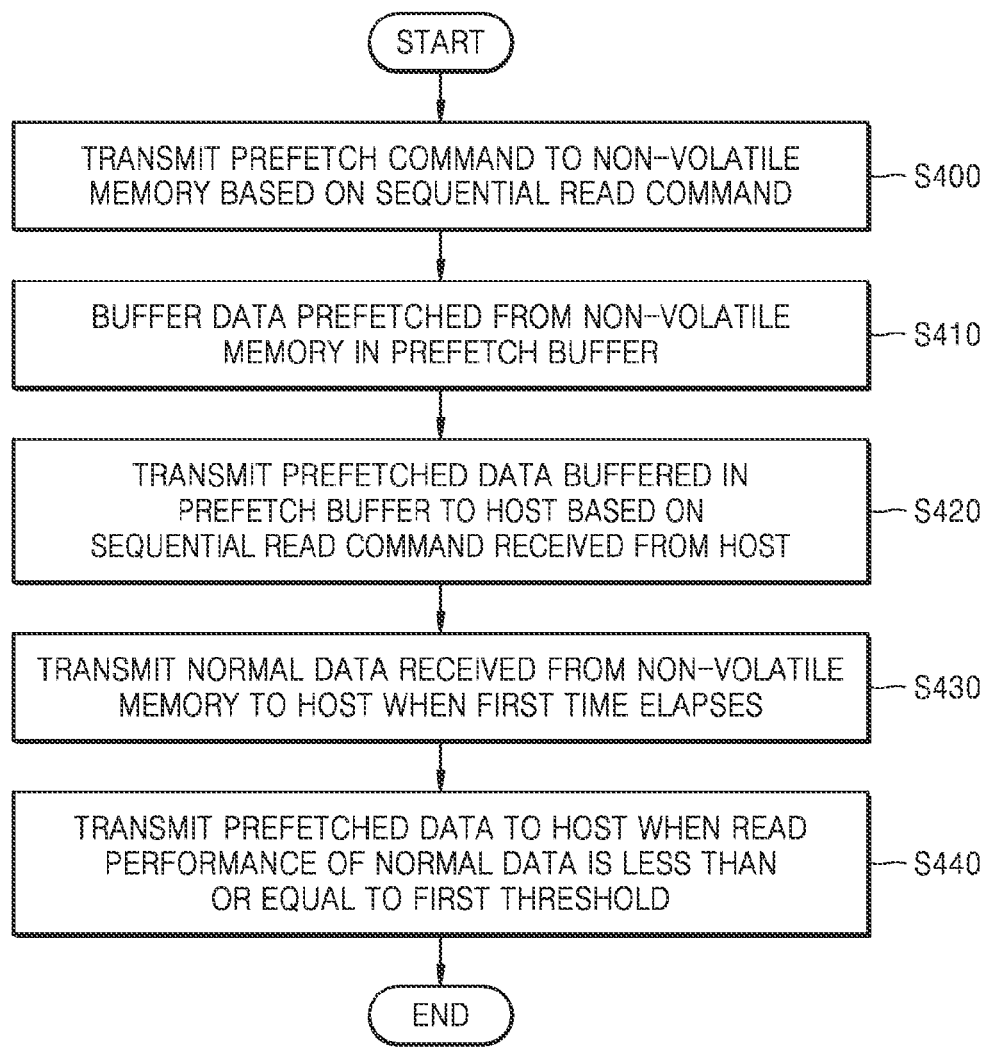
FIG. 10 is a flowchart illustrating an operating method of a storage device according to an embodiment of the inventive concept.

FIG. 10 is a flowchart illustrating an operating method of a storage device according to an embodiment of the inventive concept.

Referring to FIG. 10, the operating method of the storage device according to the present embodiment is a method in which, during a sequential read operation performed on a non-volatile memory, the storage device performs a read operation by controlling a data prefetching operation. For example, the operating method may be performed by the storage device 230 of FIG. 3. Hereinafter, the operating method will be described with reference to FIGS. 1, 3, and 10.

In operation S400, based on a sequential read command received from the host 100, the storage controller 210 transmits a prefetch command to the NVM 220. In operation S410, prefetched data D_P prefetched from the NVM 220 in response to the prefetch command is buffered in the prefetch buffer 212. In operation S420, based on the sequential read command received from the host 100, the storage controller 210 transmits the prefetched data D_P buffered in the prefetch buffer 212 to the host 100. In operation S430, when a first time elapses, the storage controller 210 transmits normal data D_N received from the NVM 220 to the host 100. In operation S440, when the read performance of the normal data D_N is less than or equal to the first threshold TH1, the storage controller 210 transmits the prefetched data D_P to the host 100. According to an embodiment, when the read performance of the normal data D_N is greater than the first threshold TH1, the storage controller 210 may transmit the normal data N P to the host 100.

Figure 11:
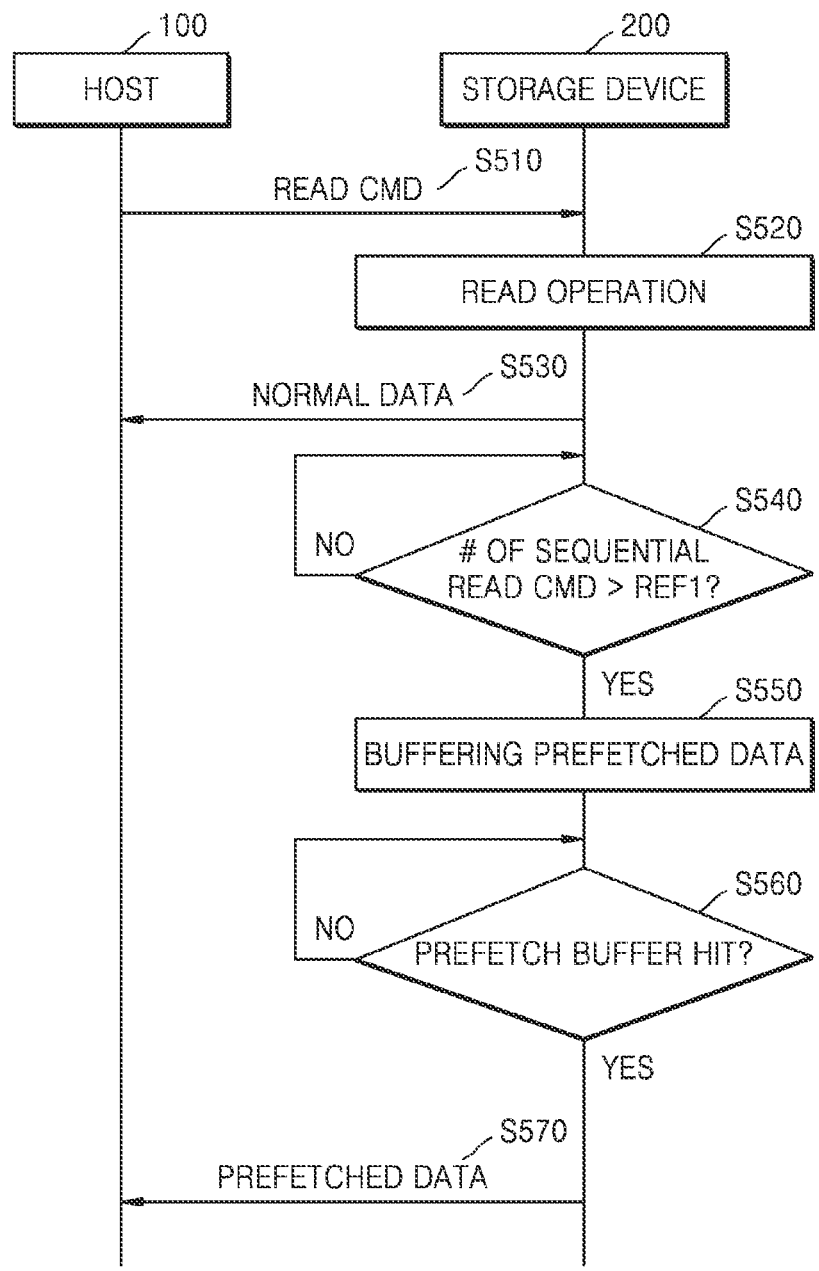
FIG. 11 is a flowchart illustrating operations of a host and a storage device according to an embodiment of the inventive concept.

FIG. 11 is a flowchart illustrating operations of the host 100 and the storage device 200 according to an embodiment of the inventive concept.

Referring to FIG. 11, in operation S510, the host 100 transmits a read command to the storage device 200. For example, the host 100 may transmit a packet including a read command and an address to the storage device 200. In operation S520, the storage device 200 performs a read operation in response to the read command. In operation S530, the storage device 200 transmits normal data D_N to the host 100. For example, the storage device 200 may transmit a packet including normal data D_N to the host 100. Operations S510 to S530 may be repeatedly performed. For example, the host 100 may sequentially transmit a plurality of read commands to the storage device 200.

In operation S540, the storage device 200 determines whether the number of sequential read commands is greater than the first reference value REF1. When the number of sequential read commands is greater than the first reference value REF1, in operation S550, the storage device 200 buffers the prefetched data D_P in the prefetch buffer 212. Operations S520 to S550 will be described in more detail with reference to FIG. 13.

In operation S560, the storage device 200 determines whether the address of a sequential read command corresponds to the address of the buffered prefetched data D_P. In other words, in operation S560, the storage device 200 determines whether the prefetch buffer 212 is hit, based on the address of the sequential read command. When the address of the sequential read command corresponds to the address of the buffered prefetched data D_P, in operation S570, the storage device 200 transmits the prefetched data D_P buffered in the prefetch buffer 212 to the host 100. If the storage device 200 determines that the prefetch buffer 212 is not hit, the storage device 200 may output normal data D_N to the host 100.

Figure 12:
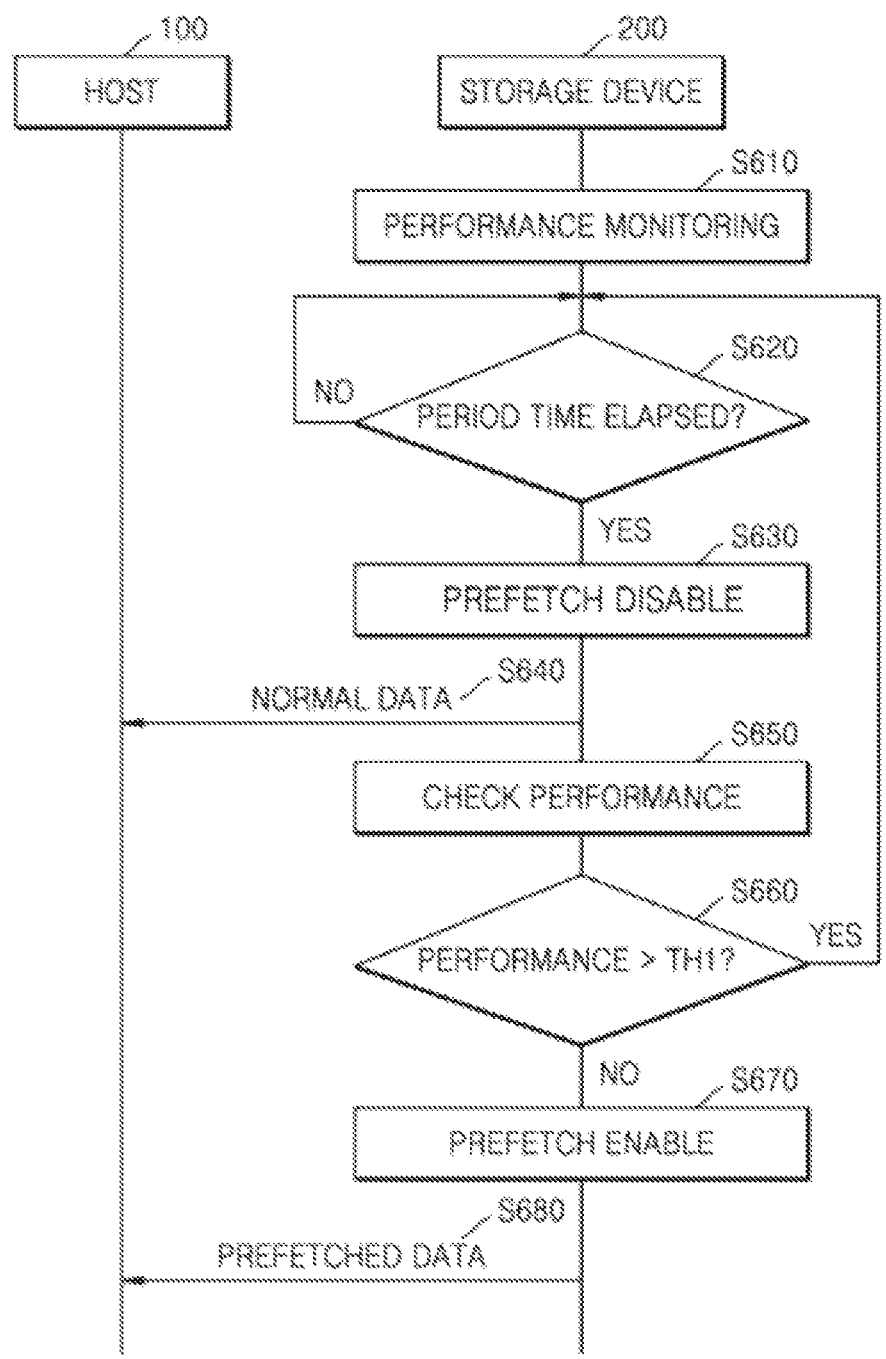
FIG. 12 is a flowchart illustrating operations of a host and a storage device according to an embodiment of the inventive concept.

FIG. 12 is a flowchart illustrating operations of the host 100 and the storage device 200 according to an embodiment of the inventive concept.

Referring to FIG. 12, in operation S610, the storage device 200 monitors the performance of the read data D_R. For example, the performance monitor circuit 214 may generate the performance signal PS by monitoring the performance of the read data D_R. For example, operation S610 may be performed after operation S580 of FIG. 11. In operation S620, the storage device 200 determines whether a predetermined period of time has elapsed. In an embodiment, the storage device 200 determines whether the period of time has elapsed from a point in time when prefetching is enabled. In an embodiment, in a prefetch enable period, the storage device 200 determines whether the period of time has elapsed from a point in time when the performance signal PS is greater than the second threshold TH2.

As a result of the determination, when the period of time elapses, in operation S630, the storage device 200 determines the prefetch request signal REQ_PRF has a disable level, and disables a data prefetching operation. In operation S640, the storage device 200 transmits the normal data D_N as the read data D_R to the host 100. In operation S650, the storage device 200 checks the performance of the read data D_R, that is, the performance of the normal data D_N. In operation S660, the storage device 200 determines whether the performance is greater than the first threshold TH1. As a result of the determination, when the performance is not greater than the first threshold TH1, in operation S670, the storage device 200 generates the prefetch request signal REQ_PRF having an enable level, and enables the data prefetching operation. In operation S680, the storage device 200 transmits the prefetched data D_P as the read data D_R to the host 100.

Figure 13:
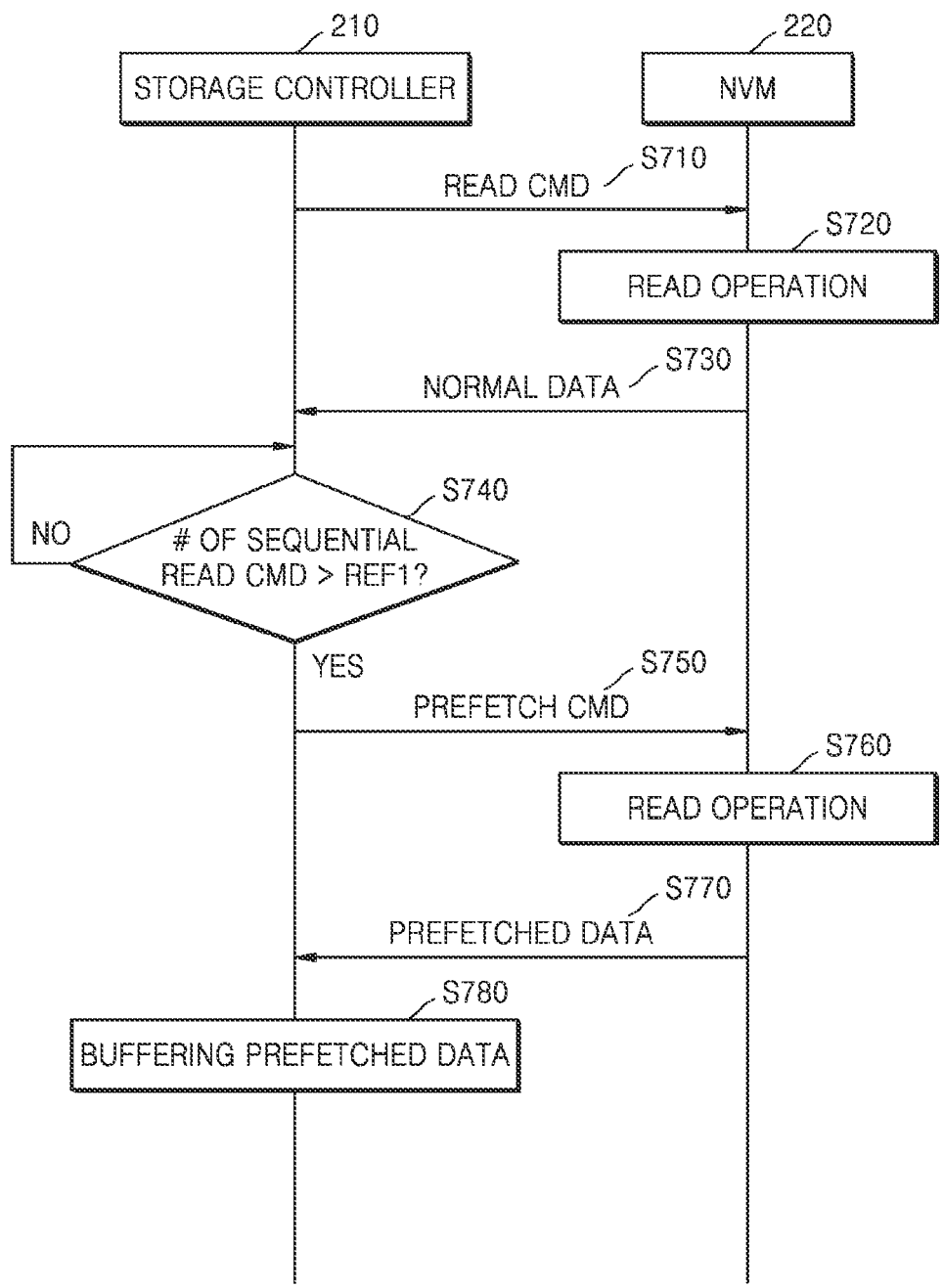
FIG. 13 is a flowchart illustrating operations of a storage controller and a non-volatile memory according to an embodiment of the inventive concept.

FIG. 13 is a flowchart illustrating operations of the storage controller 210 and the NVM 220 according to an embodiment of the inventive concept.

Referring to FIGS. 3 and 13, in operation S710, the storage controller 210 transmits a read command to the NVM 220. For example, operation S710 may be performed after operation S510 of FIG. 11. In operation S720, the NVM 220 performs a read operation on the memory cell array 221 in response to the read command. In operation S730, the NVM 220 transmits the normal data D_N generated according to the read operation to the storage controller 210.

In operation S740, the storage controller 210 determines whether the number of sequential read commands is greater than the first reference value REF1. As a result of the determination, when the number of sequential read commands is greater than the first reference value REF1, the storage controller 210 transmits a prefetch command to the NVM 220. In operation S760, the NVM 220 performs a read operation on the memory cell array 221 in response to the prefetch command. In operation S770, the NVM 220 transmits the prefetched data D_P generated according to the read operation to the storage controller 210. In operation S780, the storage controller 210 buffers the prefetched data in the prefetch buffer 212.

Figure 14:
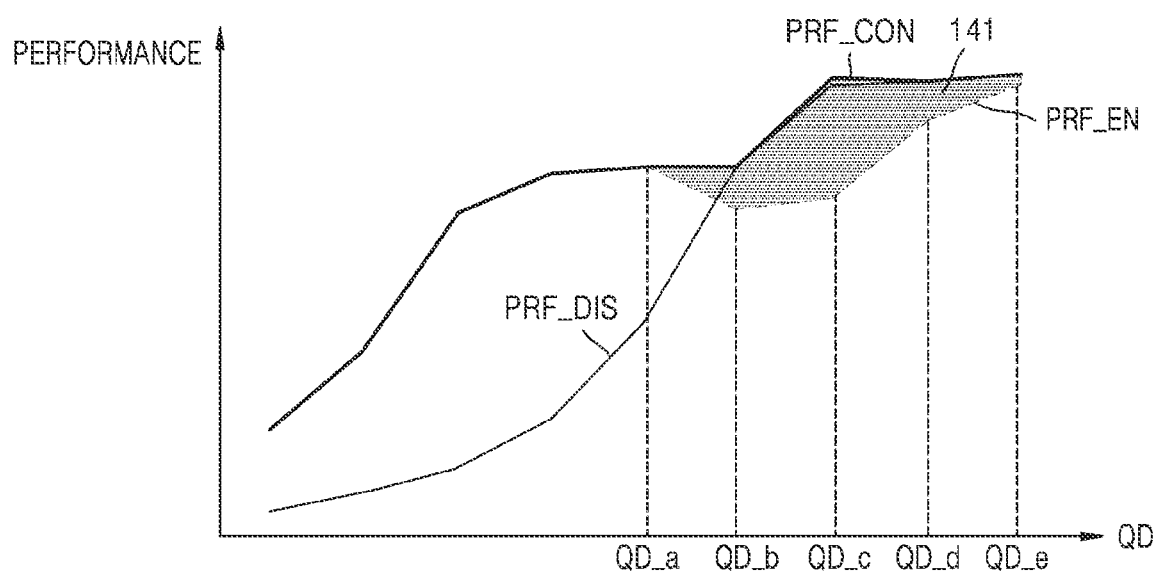
FIG. 14 is a graph illustrating a prefetch control operation of a storage device according to an embodiment of the inventive concept.

FIG. 14 is a graph illustrating a prefetch control operation of the storage device 200 according to an embodiment of the inventive concept.

Referring to FIG. 14, the horizontal axis represents QD, and the vertical axis represents performance. In FIG. 14, read performance during prefetch an enable PRF_EN, read performance during a prefetch disable PRF_DIS, and read performance during a prefetch control PRF_CON according to the present embodiment are illustrated. A first QD QD_a to a fifth QD QD_e may correspond to different arbitrary QDs. Hereinafter, the prefetch control operation will be described with reference to FIGS. 3, 6, and 14.

When a sequential read operation is performed on the NVM 220, up to the first QD QD_a, the read performance during the prefetch enable PRF_EN may be higher than the read performance during the prefetch disable PRF_DIS. However, when the QD is higher than the first QD QD_a, the read performance during the prefetch disable PRF_DIS may be higher than the read performance during the prefetch enable PRF_EN.

According to the present embodiment, the prefetch control circuit 211 of the storage device 200 may improve the read performance in a performance improvement section 141, compared to the read performance during the prefetch enable PRF_EN, through the prefetch control PRF_CON. During a sequential read operation, the prefetch control circuit 211 may determine an enable mode for generating a prefetch request signal REQ_PRF to have an enable level as a default mode. In addition, the prefetch control circuit 211 may periodically generate the prefetch request signal REQ_PRF at a disable level and check the read performance to dynamically determine a prefetch mode as a prefetch enable mode or a prefetch disable mode. Accordingly, even when the QD is higher than the first QD QD_a, the read performance may be improved overall by dynamically controlling the prefetch request signal REQ_PRF.

Figure 15:
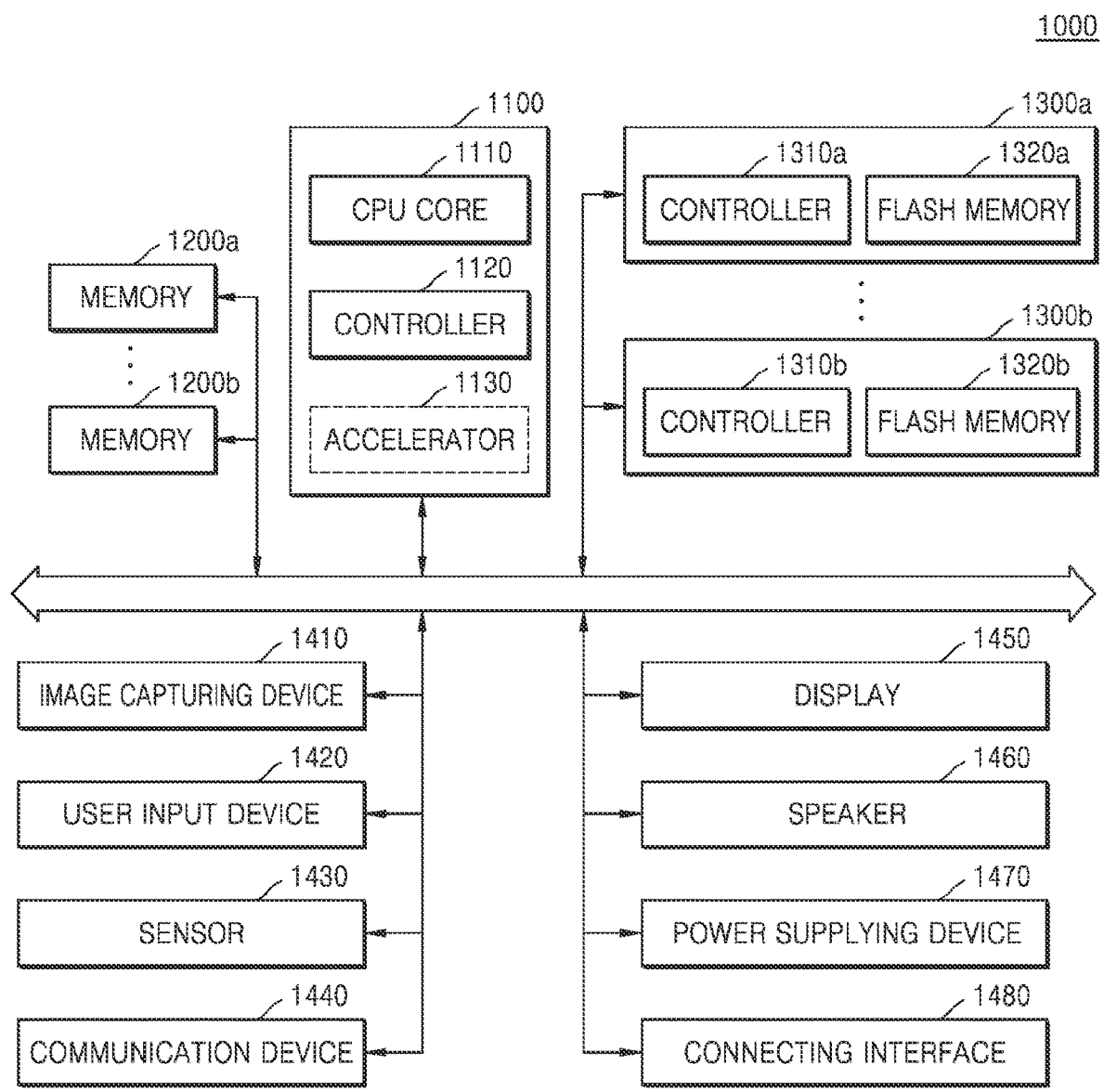
FIG. 15 is a diagram of a system to which a storage device is applied, according to an embodiment of the inventive concept.

FIG. 15 is a diagram of a system 1000 to which a storage device is applied, according to an embodiment of the inventive concept. The system 1000 of FIG. 1 may be a mobile system, such as a portable communication terminal (e.g., a mobile phone), a smartphone, a tablet personal computer (PC), a wearable device, a healthcare device, or an Internet of things (IOT) device. However, the system 1000 of FIG. 1 is not necessarily limited to the mobile system and may be a PC, a laptop computer, a server, a media player, or an automotive device (e.g., a navigation device).

Referring to FIG. 15, the system 1000 includes a main processor 1100, memories (e.g., 1200a and 1200b), and storage devices (e.g., 1300a and 1300b). In addition, the system 1000 may include at least one of an image capturing device 1410, a user input device 1420, a sensor 1430, a communication device 1440 (e.g., a transceiver, modem, etc.), a display 1450, a speaker 1460, a power supplying device 1470, and a connecting interface 1480.

The main processor 1100 may control all operations of the system 1000, more specifically, operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200a and 1200b and/or the storage devices 1300a and 1300b. In some embodiments, the main processor 1100 may further include an accelerator 1130, which is a dedicated circuit for performing a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200a and 1200b may be used as main memory devices of the system 1000. Although each of the memories 1200a and 1200b may include a volatile memory, such as static random access memory (SRAM) and/or dynamic RAM (DRAM), each of the memories 1200a and 1200b may include non-volatile memory, such as a flash memory, phase-change RAM (PRAM) and/or resistive RAM (RRAM). The memories 1200a and 1200b may be implemented in the same package as the main processor 1100.

The storage devices 1300a and 1300b may serve as non-volatile storage devices configured to store data regardless of whether power is supplied thereto, and have larger storage capacity than the memories 1200a and 1200b. The storage devices 1300a and 1300b may respectively include storage controllers 1310a and 1310b and Non-Volatile Memories (NVMs) 1320a and 1320b configured to store data via the control of the storage controllers 1310a and 1310b. Although the NVMs 1320a and 1320b may include flash memories having a two-dimensional (2D) structure or a three-dimensional (3D) V-NAND structure, the NVMs 1320a and 1320b may include other types of NVMs, such as PRAM and/or RRAM.

The storage devices 1300a and 1300b may be physically separated from the main processor 1100 and included in the system 1000 or implemented in the same package as the main processor 1100. In addition, the storage devices 1300a and 1300b may be types of solid-state devices (SSDs) or memory cards and be removably combined with other components of the system 1000 through an interface, such as the connecting interface 1480 that will be described below. The storage devices 1300a and 1300b may be devices to which a standard protocol, such as a universal flash storage (UFS), an embedded multi-media card (eMMC), or a non-volatile memory express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery (not shown) embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

Figure 16:
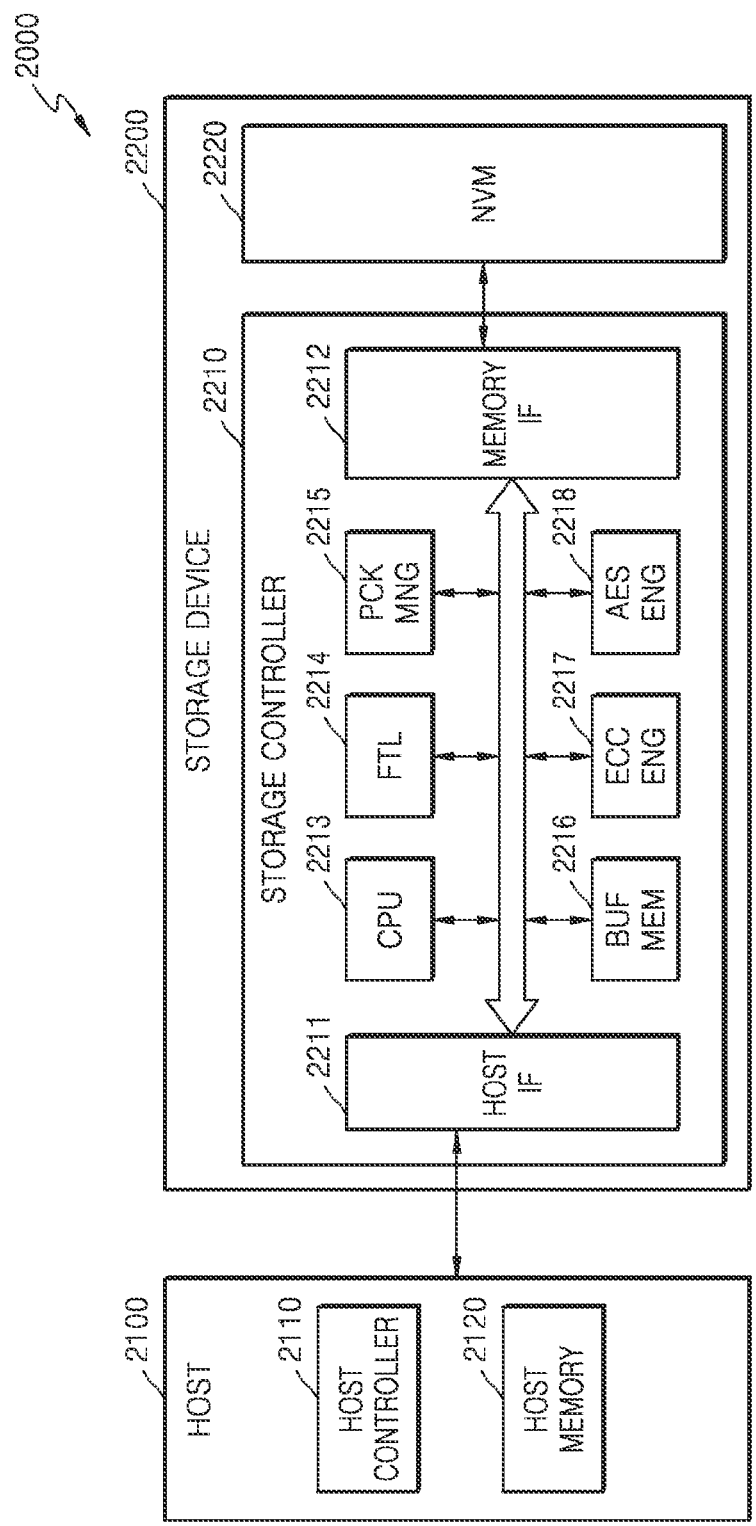
FIG. 16 is a block diagram of a host storage system according to an example embodiment of the inventive concept.

FIG. 16 is a block diagram of a host storage system 2000 according to an example embodiment of the inventive concept.

The host storage system 2000 may include a host 2100 and a storage device 2200. Further, the storage device 2200 may include a storage controller 2210 and an NVM 2220. According to an example embodiment, the host 2100 may include a host controller 2110 and a host memory 2120. The host memory 2120 may serve as a buffer memory configured to temporarily store data to be transmitted to the storage device 2200 or data received from the storage device 2200.

The storage device 2200 may include storage media configured to store data in response to requests from the host 100. As an example, the storage device 2200 may include at least one of an SSD, an embedded memory, and a removable external memory. When the storage device 2200 is an SSD, the storage device 2200 may be a device that conforms to an NVMe standard. When the storage device 2200 is an embedded memory or an external memory, the storage device 2200 may be a device that conforms to a UFS standard or an eMMC standard. Each of the host 2100 and the storage device 2200 may generate a packet according to an adopted standard protocol and transmit the packet.

When the NVM 2220 of the storage device 2200 includes a flash memory, the flash memory may include a 2D NAND memory array or a 3D (or vertical) NAND (VNAND) memory array. As another example, the storage device 2200 may include various other kinds of NVMs. For example, the storage device 2200 may include magnetic RAM (MRAM), spin-transfer torque MRAM, conductive bridging RAM (CBRAM), ferroelectric RAM (FRAM), PRAM, RRAM, and various other kinds of memories.

According to an embodiment, the host controller 2110 and the host memory 2120 may be implemented as separate semiconductor chips. Alternatively, in some embodiments, the host controller 2110 and the host memory 2120 may be integrated in the same semiconductor chip. As an example, the host controller 2110 may be any one of a plurality of modules included in an application processor (AP). The AP may be implemented as a System on Chip (SoC). Further, the host memory 2120 may be an embedded memory included in the AP or an NVM or memory module located outside the AP.

The host controller 2110 may manage an operation of storing data (e.g., write data) of a buffer region of the host memory 2120 in the NVM 2220 or an operation of storing data (e.g., read data) of the NVM 2220 in the buffer region.

The storage controller 2210 may include a host interface 2211, a memory interface 2212, and a CPU 2213. Further, the storage controller 2210 may further include a flash translation layer (FTL) 2214, a packet manager 2215, a buffer memory 2216, an error correction code (ECC) engine 2217, and an advanced encryption standard (AES) engine 2218. The storage controller 2210 may further include a working memory (not shown) in which the FTL 2214 is loaded. The CPU 2213 may execute the FTL 2214 to control data write and read operations on the NVM 2220.

The host interface 2211 may transmit and receive packets to and from the host 2100. A packet transmitted from the host 2100 to the host interface 2211 may include a command or data to be written to the NVM 2220. A packet transmitted from the host interface 2211 to the host 2100 may include a response to the command or data read from the NVM 2220.

The memory interface 2212 may transmit data to be written to the NVM 2220 to the NVM 2220 or receive data read from the NVM 2220. The memory interface 2212 may be configured to comply with a standard protocol, such as Toggle or open NAND flash interface (ONFI).

The FTL 2214 may perform various functions, such as an address mapping operation, a wear-leveling operation, and a garbage collection operation. The address mapping operation may be an operation of converting a logical address received from the host 2100 into a physical address used to actually store data in the NVM 2220. The wear-leveling operation may be a technique for preventing excessive deterioration of a specific block by allowing blocks of the NVM 2220 to be uniformly used. As an example, the wear-leveling operation may be implemented using a firmware technique that balances erase counts of physical blocks. The garbage collection operation may be a technique for ensuring usable capacity in the NVM 2220 by erasing an existing block after copying valid data of the existing block to a new block.

The packet manager 2215 may generate a packet according to a protocol of an interface, which consents to the host 2100, or parse various types of information from the packet received from the host 2100. In addition, the buffer memory 2216 may temporarily store data to be written to the NVM 2220 or data to be read from the NVM 2220. Although the buffer memory 2216 may be a component included in the storage controllers 2210, the buffer memory 2216 may be outside the storage controllers 2210.

The ECC engine 2217 may perform error detection and correction operations on read data read from the NVM 2220. More specifically, the ECC engine 2217 may generate parity bits for write data to be written to the NVM 2220, and the generated parity bits may be stored in the NVM 2220 together with write data. During the reading of data from the NVM 2220, the ECC engine 2217 may correct an error in the read data by using the parity bits read from the NVM 2220 along with the read data, and output error-corrected read data.

The AES engine 2218 may perform at least one of an encryption operation and a decryption operation on data input to the storage controllers 2210 by using a symmetric-key algorithm.

Figure 17:
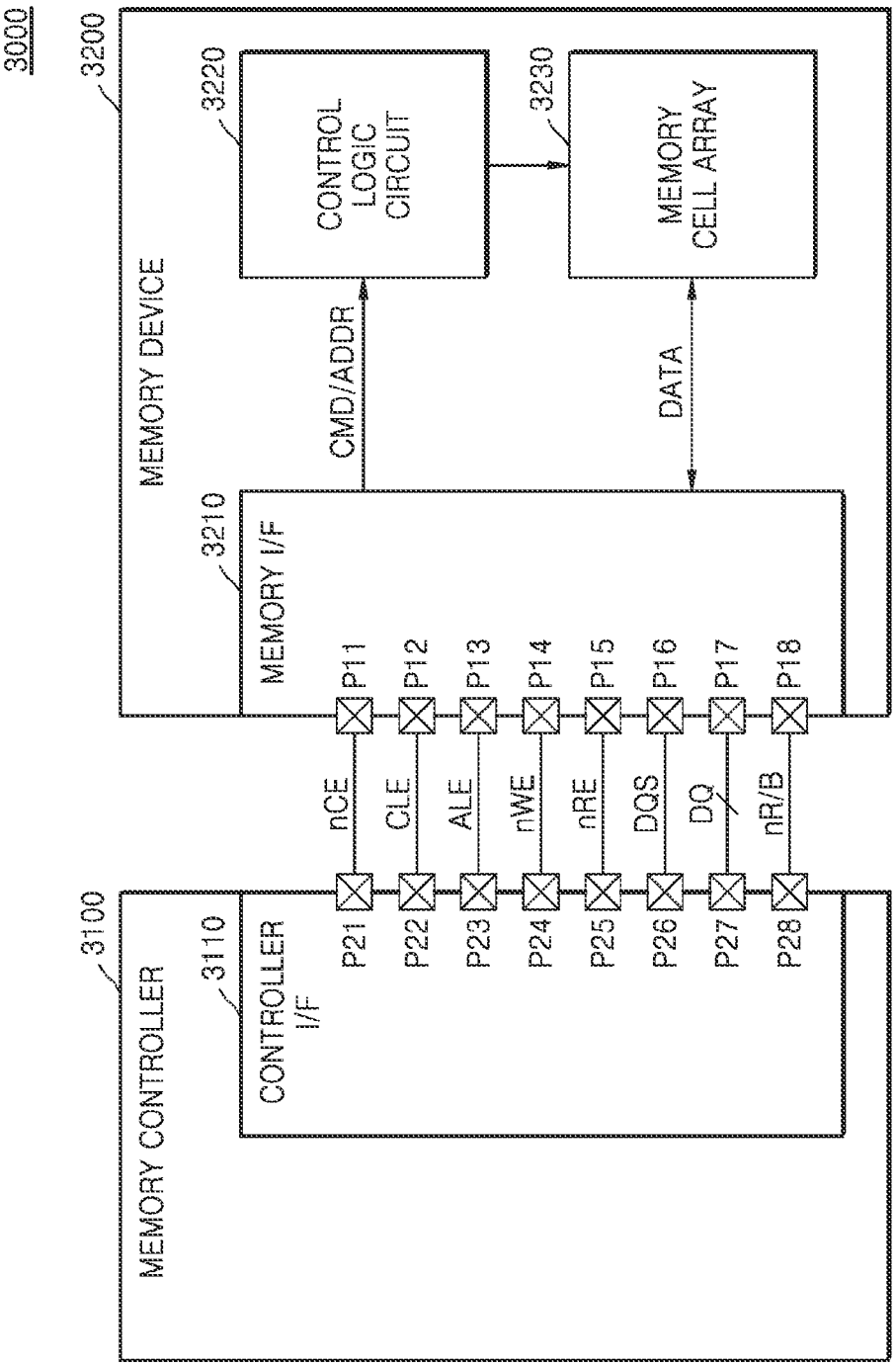
FIG. 17 is a block diagram of a memory system according to an embodiment of the inventive concept.

FIG. 17 is a block diagram of a memory system 3000 according to an embodiment of the inventive concept.

Referring to FIG. 17, the memory system 3000 may include a memory device 3200 and a memory controller 3100. The memory device 3200 may correspond to an NVM device, which communicates with the memory controller 3100 based on one of a plurality of channels. For example, the memory device 3200 may correspond to the NVM 220 in FIG. 3, and the memory controller 3100 may correspond to the storage controller 210 in FIG. 3.

The memory device 3200 may include first through eighth pins P11 through P18, a memory interface circuit 3210, a control logic circuit 3220, and a memory cell array 3230. The memory interface circuit 3210 may receive a chip enable signal nCE from the memory controller 3100 through the first pin P11. The memory interface circuit 3210 may exchange signals with the memory controller 3100 through the second through eighth pins P12 through P18 according to the chip enable signal nCE. For example, when the chip enable signal nCE is enabled (e.g., at a low level), the memory interface circuit 3210 may exchange signals with the memory controller 3100 through the second through eighth pins P12 through P18 according to the chip enable signal nCE.

The memory interface circuit 3210 may receive a command latch enable signal CLE, an address latch enable signal ALE, and a write enable signal nWE from the memory controller 3100 through the second through fourth pins P12 through P14, respectively. The memory interface circuit 3210 may receive or transmit a data signal DQ from or to the memory controller 3100 through the seventh pin P17. The command CMD, an address ADDR, and data DATA may be transmitted through the data signal DQ. For example, the data signal DQ may be transmitted through a plurality of data signal lines. In this case, the seventh pin P17 may include a plurality of pins respectively corresponding to the data signal lines.

The memory interface circuit 3210 may acquire the command CMD from the data signal DQ, which is received in an enable period (e.g., a high-level state) of the command latch enable signal CLE, based on toggle timings of the write enable signal nWE. The memory interface circuit 3210 may acquire the address ADDR from the data signal DQ, which is received in an enable period (e.g., a high-level state) of the address latch enable signal ALE, based on the toggle timings of the write enable signal nWE.

In an example embodiment, the write enable signal nWE may remain in a static state (e.g., a high level or a low level) and toggle between the high level and the low level. For example, the write enable signal nWE may toggle in a period in which the command CMD or the address ADDR is transmitted. Accordingly, the memory interface circuit 3210 may acquire the command CMD or the address ADDR based on the toggle timings of the write enable signal nWE.

The memory interface circuit 3210 may receive a read enable signal nRE from the memory controller 3100 through the fifth pin P15. The memory interface circuit 3210 may receive or transmit a data strobe signal DQS from or to the memory controller 3100 through the sixth pin P16.

In a data output operation of the memory device 3200, the memory interface circuit 3210 may receive the read enable signal nRE, which toggles, through the fifth pin P15 before outputting the data DATA. The memory interface circuit 3210 may generate the data strobe signal DQS, which toggles, based on toggling of the read enable signal nRE. For example, the memory interface circuit 3210 may generate the data strobe signal DQS, which starts toggling after a certain delay (e.g., tDQSRE) from a toggling start time of the read enable signal nRE. The memory interface circuit 3210 may transmit the data signal DQ including the data DATA based on toggle timings of the data strobe signal DQS. Accordingly, the data DATA may be transmitted to the memory controller 3100 in synchronization with the toggle timings of the data strobe signal DQS.

In a data input operation of the memory device 3200, when the data signal DQ including the data DATA is received from the memory controller 3100, the memory interface circuit 3210 may receive the data strobe signal DQS, which toggles, from the memory controller 3100 together with the data DATA. The memory interface circuit 3210 may acquire the data DATA from the data signal DQ based on the toggle timings of the data strobe signal DQS. For example, the memory interface circuit 3210 may acquire the data DATA by sampling the data signal DQ at rising and falling edges of the data strobe signal DQS.

The memory interface circuit 3210 may transmit a ready/busy output signal nR/B to the memory controller 3100 through the eighth pin P18. The memory interface circuit 3210 may transmit state information of the memory device 3200 to the memory controller 3100 through the ready/busy output signal nR/B. When the memory device 3200 is in a busy state (that is, when internal operations of the memory device 3200 are being performed), the memory interface circuit 3210 may transmit the ready/busy output signal nR/B indicating the busy state to the memory controller 3100. When the memory device 3200 is in a ready state (that is, when internal operations of the memory device 3200 are not performed or are completed), the memory interface circuit 3210 may transmit the ready/busy output signal nR/B indicating the ready state to the memory controller 3100. For example, while the memory device 3200 is reading the data DATA from the memory cell array 3230 in response to a read command, the memory interface circuit 3210 may transmit the ready/busy output signal nR/B indicating the busy state (e.g., a low level) to the memory controller 3100. For example, while the memory device 3200 is programming the data DATA to the memory cell array 3230 in response to a program command, the memory interface circuit 3210 may transmit the ready/busy output signal nR/B indicating the busy state to the memory controller 3100.

The control logic circuit 3220 may control various operations of the memory device 3200. The control logic circuit 3220 may receive the command CMD and/or the address ADDR from the memory interface circuit 3210. The control logic circuit 3220 may generate control signals for controlling other elements of the memory device 3200 according to the command CMD and/or the address ADDR. For example, the control logic circuit 3220 may generate various control signals for programming the data DATA to the memory cell array 3230 or reading the data DATA from the memory cell array 3230.

The memory cell array 3230 may store the data DATA from the memory interface circuit 3210 under the control of the control logic circuit 3220. The memory cell array 3230 may output the data DATA, which has been stored therein, to the memory interface circuit 3210 under the control of the control logic circuit 3220.

The memory cell array 3230 may include a plurality of memory cells. For example, the memory cells may include flash memory cells. However, embodiments are not limited thereto. The memory cells may include RRAM cells, ferroelectric RAM (FRAM) cells, PRAM cells, thyristor RAM (TRAM) cells, or MRAM cells. Hereinafter, embodiments will be described focusing on the case where the memory cells include NAND flash memory cells.

The memory controller 3100 may include first through eighth pins P21 through P28 and a controller interface circuit 3110. The first through eighth pins P21 through P28 may respectively correspond to the first through eighth pins P11 through P18 of the memory device 3200. The controller interface circuit 3110 may transmit the chip enable signal nCE to the memory device 3200 through the first pin P21. The controller interface circuit 3110 may exchange signals with the memory device 3200 through the second through eighth pins P22 through P28 according to the chip enable signal nCE.

The controller interface circuit 3110 may transmit the command latch enable signal CLE, the address latch enable signal ALE, and the write enable signal nWE to the memory device 3200 through the second through fourth pins P22 through P24, respectively. The controller interface circuit 3110 may transmit or receive the data signal DQ to or from the memory device 3200 through the seventh pin P27.

The controller interface circuit 3110 may transmit the data signal DQ, which includes the command CMD or the address ADDR, to the memory device 3200 together with the write enable signal nWE, which toggles. The controller interface circuit 3110 may transmit the data signal DQ including the command CMD to the memory device 3200 by transmitting the command latch enable signal CLE, which is in the enable state, and transmit the data signal DQ including the address ADDR to the memory device 3200 by transmitting the address latch enable signal ALE, which is in the enable state.

The controller interface circuit 3110 may transmit the read enable signal nRE to the memory device 3200 through the fifth pin P25. The controller interface circuit 3110 may receive or transmit the data strobe signal DQS from or to the memory device 3200 through the sixth pin P26.

In a data output operation of the memory device 3200, the controller interface circuit 3110 may generate and transmit the read enable signal nRE, which toggles, to the memory device 3200. For example, before the output of the data DATA, the controller interface circuit 3110 may generate the read enable signal nRE, which is converted from a static state (e.g., a high level or a low level) into a toggling state. Accordingly, the memory device 3200 may generate the data strobe signal DQS, which toggles, based on the read enable signal nRE. The controller interface circuit 3110 may receive the data signal DQ including the data DATA and the data strobe signal DQS, which toggles, from the memory device 3200. The controller interface circuit 3110 may acquire the data DATA from the data signal DQ based on the toggle timings of the data strobe signal DQS.

In a data input operation of the memory device 3200, the controller interface circuit 3110 may generate the data strobe signal DQS, which toggles. For example, before transmitting the data DATA, the controller interface circuit 3110 may generate the data strobe signal DQS, which is converted from a static state (e.g., a high level or a low level) into a toggling state. The controller interface circuit 3110 may transmit the data signal DQ including the data DATA to the memory device 3200 based on the toggle timings of the data strobe signal DQS.

The controller interface circuit 3110 may receive the ready/busy output signal nR/B from the memory device 3200 through the eighth pin P28. The controller interface circuit 3110 may determine state information of the memory device 3200 based on the ready/busy output signal nR/B.

Figure 18:
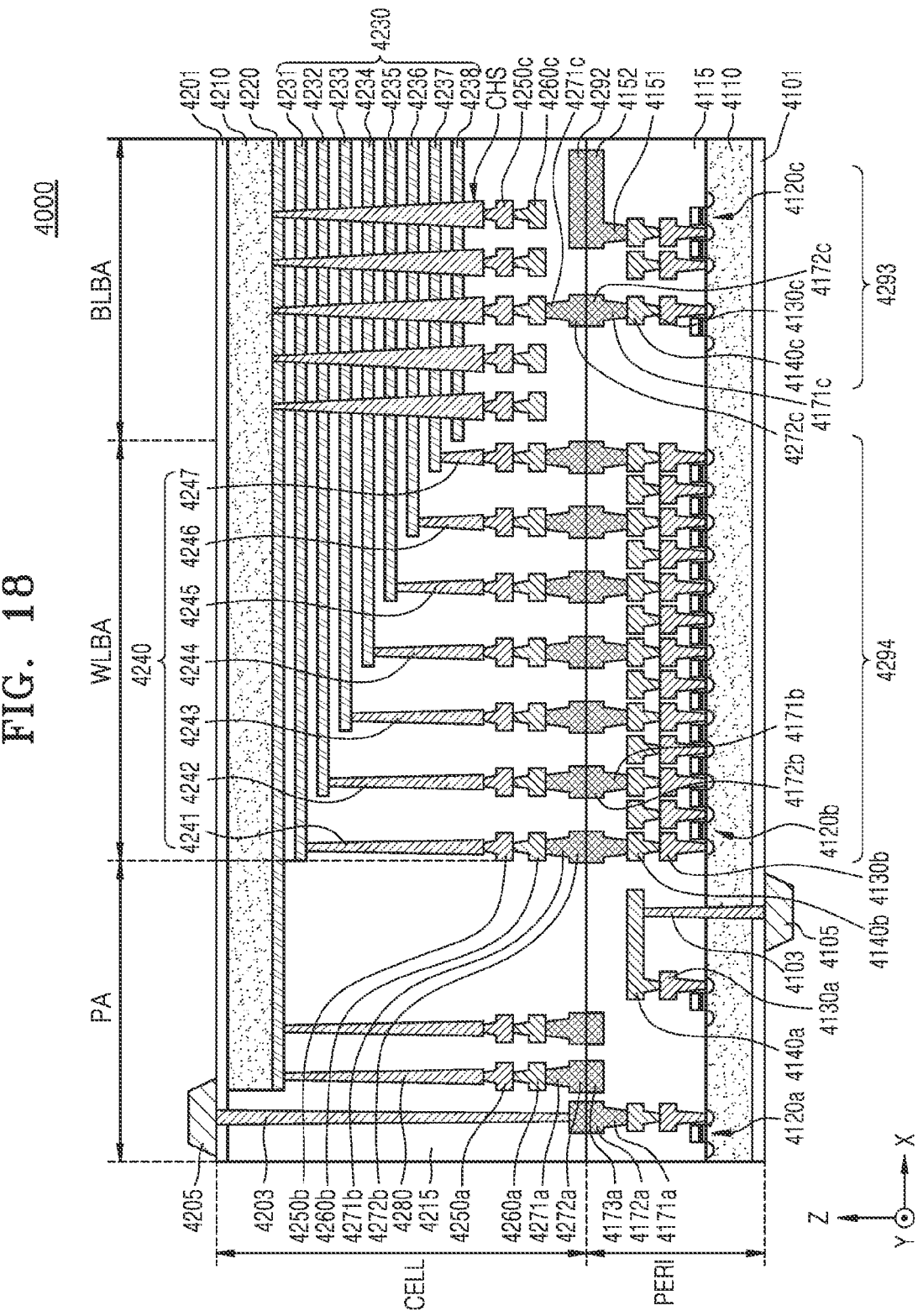
FIG. 18 is a diagram illustrating a bonding vertical NAND (B-VNAND) structure applicable to a memory device, according to an embodiment of the inventive concept.

FIG. 18 is a diagram illustrating a bonding VNAND (B-VNAND) structure applicable to a memory device, according to an embodiment of the inventive concept. When a non-volatile memory included in the memory device is implemented by a B-VNAND type flash memory, the non-volatile memory may have the structure illustrated in FIG. 18.

Referring to FIG. 18, a memory device 4000 may have a chip-to-chip (C2C) structure. In the C2C structure, an upper chip including a cell area CELL may be formed on a first wafer, a lower chip including a peripheral circuit area PERI may be formed on a second wafer different from the first wafer, and the upper chip may be connected to the lower chip using a bonding method. For example, the bonding method may refer to a method of electrically connecting a bonding metal formed in a topmost metal layer of the upper chip to a bonding metal formed in a topmost metal layer of the lower chip. For example, when the bonding metal includes copper (Cu), the bonding method may include a Cu—Cu bonding method. The bonding metal may include aluminum or tungsten.

Each of the peripheral circuit area PERI and the cell area CELL of the memory device 4000 may include an external pad bonding area PA, a word line bonding area WLBA, and a bit line bonding area BLBA.

The peripheral circuit area PERI may include a first substrate 4110, an interlayer insulating layer 4115, a plurality of circuit devices 4120*a*, 4120*b*, and 4120*c* formed in the first substrate 4110, first metal layers 4130*a*, 4130*b*, and 4130*c* respectively connected to the circuit devices 4120*a*, 4120*b*, and 4120*c*, and second metal layers 4140*a*, 4140*b*, and 4140*c* respectively formed on the first metal layers 4130*a*, 4130*b*, and 4130*c*. In an embodiment, the first metal layers 4130*a*, 4130*b*, and 4130*c* may include tungsten having a relatively higher resistance, and the second metal layers 4140*a*, 4140*b*, and 4140*c* may include copper having a relatively lower resistance.

In this specification, only the first metal layers 4130*a*, 4130*b*, and 4130*c* and the second metal layers 4140*a*, 4140*b*, and 4140*c* are illustrated and described, but embodiments are not limited thereto. At least one metal layer may be further formed on the second metal layers 4140*a*, 4140*b*, and 4140*c*. At least a portion of the at least one metal layer on the second metal layers 4140*a*, 4140*b*, and 4140*c* may include aluminum, which has a lower resistance than copper included in the second metal layers 4140*a*, 4140*b*, and 4140*c*.

The interlayer insulating layer 4115 may be arranged on the first substrate 4110 to cover the circuit devices 4120*a*, 4120*b*, and 4120*c*, the first metal layers 4130*a*, 4130*b*, and 4130*c*, and the second metal layers 4140*a*, 4140*b*, and 4140*c* and may include an insulating material such as silicon oxide or silicon nitride.

Lower bonding metals 4171*b* and 4172*b* may be formed on the second metal layer 4140*b* in the word line bonding area WLBA. In the word line bonding area WLBA, the lower bonding metals 4171*b* and 4172*b* of the peripheral circuit area PERI may be electrically connected to upper bonding metals 4271*b* and 4272*b* of the cell area CELL using a bonding method. The lower bonding metals 4171*b* and 4172*b* and the upper bonding metals 4271*b* and 4272*b* may include aluminum, copper, or tungsten.

The cell area CELL may provide at least one memory block. The cell area CELL may include a second substrate 4210 and a common source line 4220. A plurality of word lines 4231 through 4238 (collectively denoted by 4230) may be stacked on the second substrate 4210 in a direction (e.g., a Z-axis direction) perpendicular to a top surface of the second substrate 4210. String selection lines may be arranged above the word lines 4230 and a ground selection line may be arranged below the word lines 4230. The word lines 4230 may be arranged between the string selection lines and the ground selection line.

In the bit line bonding area BLBA, a channel structure CHS may extend in the direction perpendicular to the top surface of the second substrate 4210 and pass through the word lines 4230, the string selection lines, and the ground selection line. The channel structure CHS may include a data storage layer, a channel layer, and a buried insulating layer. The channel layer may be electrically connected to a first metal layer 4250*c* and a second metal layer 4260*c*. For example, the first metal layer 4250*c* may correspond to a bit line contact, and the second metal layer 4260*c* may correspond to a bit line and may be referred to as a bit line 4260*c* below. In an embodiment, the bit line 4260*c* may extend in a first direction (e.g., a Y-axis direction) parallel with the top surface of the second substrate 4210.

In the embodiment of FIG. 18, an area, in which the channel structure CHS and the bit line 4260*c* are arranged, may be defined as the bit line bonding area BLBA. The bit line 4260*c* may be electrically connected to circuit devices 4120*c* which provide a page buffer 4293 in the peripheral circuit area PERI, in the bit line bonding area BLBA. For example, the bit line 4260c may be connected to upper bonding metals 4271c and 4272c in the bit line bonding area BLBA, and the upper bonding metals 4271c and 4272c may be connected to lower bonding metals 4171c and 4172c connected to the circuit devices 4120c of the page buffer 4293.

In the word line bonding area WLBA, the word lines 4230 may extend in a second direction (e.g., an X-axis direction) parallel with the top surface of the second substrate 4210 and may be connected to a plurality of cell contact plugs 4241 through 4247 (collectively denoted by 4240). The word lines 4230 may be connected to the cell contact plugs 4240 through pads which are provided by at least some of the word lines 4230 extending in different lengths in the second direction. A first metal layer 4250b and a second metal layer 4260b may be sequentially stacked on each of the cell contact plugs 4240 connected to the word lines 4230. The cell contact plugs 4240 in the word line bonding area WLBA may be connected to the peripheral circuit area PERI through the upper bonding metals 4271b and 4272b of the cell area CELL and the lower bonding metals 4171b and 4172b of the peripheral circuit area PERI.

The cell contact plugs 4240 may be electrically connected to circuit devices 4120b which provide a row decoder 4294 in the peripheral circuit area PERI. In an embodiment, operating voltages of the circuit devices 4120b providing the row decoder 4294 may be different from operating voltages of the circuit devices 4120c providing the page buffer 4293. For example, the operating voltages of the circuit devices 4120c providing the page buffer 4293 may be greater than the operating voltages of the circuit devices 4120b providing the row decoder 4294.

A common source line contact plug 4280 may be arranged in the external pad bonding area PA. The common source line contact plug 4280 may include a conductive material such as metal, a metal compound, or polysilicon and may be electrically connected to the common source line 4220. A first metal layer 4250a and a second metal layer 4260a may be sequentially stacked on the common source line contact plug 4280. For example, an area in which the common source line contact plug 4280, the first metal layer 4250a, and the second metal layer 4260a are arranged may be defined as the external pad bonding area PA.

First and second input/output pads 4105 and 4205 may be arranged in the external pad bonding area PA. Referring to FIG. 18, a lower insulating film 4101 covering a bottom surface of the first substrate 4110 may be formed below the first substrate 4110, and the first input/output pad 4105 may be formed on the lower insulating film 4101. The first input/output pad 4105 may be connected to at least one of the circuit devices 4120a, 4120b, and 4120c of the peripheral circuit area PERI through a first input/output contact plug 4103 and may be isolated from the first substrate 4110 by the lower insulating film 4101. A side insulating film may be arranged between the first input/output contact plug 4103 and the first substrate 4110 to electrically isolate the first input/output contact plug 4103 from the first substrate 4110.

Referring to FIG. 18, an upper insulating film 4201 covering a top surface of the second substrate 4210 may be formed above the second substrate 4210, and the second input/output pad 4205 may be arranged on the upper insulating film 4201. The second input/output pad 4205 may be connected to at least one of the circuit devices 4120a, 4120b, and 4120c of the peripheral circuit area PERI through a second input/output contact plug 4203. For example, the second input-output contact plug 4203 may be connected to the circuit element 4120a through lower bonding metals 4171a and 4172a.

According to an embodiments, the second substrate 4210 and the common source line 4220 are not arranged in an area in which the second input/output contact plug 4203 is arranged. In an embodiment, the second input/output pad 4205 does not overlap the word lines 4230 in a third direction (e.g., the Z-axis direction). Referring to FIG. 18, the second input/output contact plug 4203 may be separated from the second substrate 4210 in the direction parallel with the top surface of the second substrate 4210 and may pass through an interlayer insulating layer 4215 of the cell area CELL to be connected to the second input/output pad 4205.

According to embodiments, the first input/output pad 4105 and the second input/output pad 4205 may be selectively formed. For example, the memory device 400 may include only the first input/output pad 4105 on the first substrate 4110 or only the second input/output pad 4205 on the second substrate 4210. Alternatively, the memory device 4000 may include both the first input/output pad 4105 and the second input/output pad 4205.

A metal pattern of a topmost metal layer may be provided as a dummy pattern in the external pad bonding area PA of each of the cell area CELL and the peripheral circuit area PERI, or the topmost metal layer may be empty.

In correspondence to an upper metal pattern 4272a in the topmost metal layer of the cell area CELL, a lower metal pattern 4173a having the same shape as upper metal pattern 4272a of the cell area CELL may be formed in a topmost metal layer of the peripheral circuit area PERI in the external pad bonding area PA. In an embodiment, the lower metal pattern 4173a in the topmost metal layer of the peripheral circuit area PERI is not connected to a contact in the peripheral circuit area PERI. Similarly, in correspondence to a lower metal pattern in the topmost metal layer of the peripheral circuit area PERI in the external pad bonding area PA, an upper metal pattern having the same shape as lower metal pattern of the peripheral circuit area PERI may be formed in the topmost metal layer of the cell area CELL.

The lower bonding metals 4171b and 4172b may be formed on the second metal layer 4140b in the word line bonding area WLBA. In the word line bonding area WLBA, the lower bonding metals 4171b and 4172b of the peripheral circuit area PERI may be electrically connected to the upper bonding metals 4271b and 4272b of the cell area CELL using a bonding method.

In correspondence to a lower metal pattern 4152 formed in the topmost metal layer of the peripheral circuit area PERI, an upper metal pattern 4292 having the same shape as the lower metal pattern 4152 of the peripheral circuit area PERI may be formed in the bit line bonding area BLBA on the topmost metal layer of the cell area CELL. In an embodiment, a contact is not formed on the upper metal pattern 4292 in the topmost metal layer of the cell area CELL. For example, the lower metal pattern 4152 may be connected to the circuit element 4120c through a lower bonding metal 4151.

While the inventive concept has been particularly shown and described with reference to embodiments thereof, it will be understood that various changes in form and details may be made therein without departing from the spirit and scope of the following claims.

What is claimed is:

1. A storage controller configured to control a non-volatile memory, the storage controller comprising:

a prefetch buffer configured to buffer data prefetched from the non-volatile memory, during a prefetch operation;

a determiner circuit configured to output one of the prefetched data and normal data read from the non-volatile memory, as read data; and a prefetch control circuit configured to enable the prefetch operation during a first time when a number of consecutive addresses of the non-volatile memory greater than a predetermined number are received for reading from the non-volatile memory, disable the prefetch operation at a second time after the first time when a performance of the read data at the second time is greater than a threshold, and enable the prefetch operation or maintain the disable of the prefetch operation according to the performance of the read data in a prefetch suspend period after the second time in which the prefetch operation is disabled.

2. The storage controller of claim 1, wherein the determiner circuit is further configured to output the prefetched data as the read data when an address of a sequential read command received from a host corresponds to an address of the prefetched data buffered in the prefetch buffer.

3. The storage controller of claim 1, wherein the determiner circuit is further configured to output the normal data as the read data when an address of a sequential read command received from a host does not correspond to an address of the prefetched data buffered in the prefetch buffer.

4. The storage controller of claim 1, wherein the reading is performed when a number of consecutive read commands received from a host is greater than a first reference value.

5. The storage controller of claim 1, wherein, when a first read command and a first address are received from a host and then a second read command and a second address are received from the host, the reading is performed when the second address corresponds to a logical block address (LBA) immediately after a last LBA of the first address.

6. The storage controller of claim 1, wherein the reading is performed when a command set including a read command and a flag defining a sequential read command are received from a host.

7. The storage controller of claim 1, wherein the prefetch control circuit is further configured to transmit a prefetch command to the non-volatile memory according to a prefetch request signal having an enable level during the reading, and the prefetch buffer is further configured to buffer the prefetched data provided by the non-volatile memory in response to the prefetch command.

8. The storage controller of claim 1, further comprising:

a prefetch monitor circuit configured to generate a performance signal by monitoring the performance of the read data and provide the generated performance signal to the prefetch control circuit.

9. The storage controller of claim 8, wherein the prefetch control circuit is further configured to periodically check the performance signal in a prefetch enable period in which the prefetch operation is enabled, or periodically check the performance signal in the prefetch suspend period.

10. The storage controller of claim 8, wherein the performance signal corresponds to a read performance indicating a size of the read data transmitted from the storage controller to a host per unit time.

11. The storage controller of claim 8, wherein the prefetch control circuit is further configured to maintain a prefetch request signal at a disable level when the performance signal is greater than the threshold in the prefetch suspend period, and change a level of the prefetch request signal to an enable level when the performance signal is less than or equal to the threshold in the prefetch suspend period.

12. The storage controller of claim 11, wherein the prefetch control circuit is further configured to compare the performance signal with the threshold every performance check period when the prefetch request signal is maintained at the disable level, and maintain or terminate the prefetch suspend period according to a result of the compare.

13. The storage controller of claim 11, wherein the second time corresponds to a point in time when the performance signal is equal to or greater than a second threshold, wherein the second threshold is less than the threshold.

14. The storage controller of claim 11, wherein the prefetch control circuit is further configured to generate the prefetch request signal at the disable level every performance check period.

15. The storage controller of claim 14, further comprising:
an interval counter configured to generate an interval signal corresponding to the performance check period, wherein the prefetch control circuit is further configured to change the prefetch request signal from the enable level to the disable level according to the interval signal, or compare the performance signal with the threshold according to the interval signal.

16. An operating method of a storage controller controlling a non-volatile memory, the operating method comprising:

buffering data prefetched from the non-volatile memory in a prefetch buffer and outputting the buffered data when a number of consecutive addresses of the non-volatile memory greater than a predetermined number are received for reading from the non-volatile memory;

outputting data read from the non-volatile memory, at a first time when a performance of the output buffered data at the first time is greater than a threshold; and outputting data of the prefetch buffer or normal data read from the non-volatile memory as read data at a second time after the first time based on the performance.

17. The operating method of claim 16, wherein the buffering of the prefetched data in the prefetch buffer includes:

when a number of consecutive read commands received from a host is greater than a first reference value, transmitting a prefetch command to the non-volatile memory; and buffering, in the prefetch buffer, the prefetched data prefetched from the non-volatile memory in response to the prefetch command.

18. The operating method of claim 16, wherein the outputting of the data of the prefetch buffer as the read data includes outputting the data of the prefetch buffer as the read data when an address of a sequential read command received from a host corresponds to an address of data buffered in the prefetch buffer.

19. The operating method of claim 16, further comprising:
generating a performance signal by monitoring the performance of the read data before the outputting of the data of the prefetch buffer or the normal data as the read data, wherein the performance signal corresponds to a read performance indicating a size of the read data transmitted from the storage controller to a host per unit time.

20. An operating method of a storage device including a non-volatile memory and a storage controller, the operating method comprising:

in response to determining a number of consecutive addresses of the non-volatile memory greater than a predetermined number have been received from a host for reading from the non-volatile memory,
transmitting a prefetch command from the storage controller to the non-volatile memory;
buffering prefetched data received from the non-volatile memory in a prefetch buffer in response to the prefetch command; and
transmitting a first part of the prefetched data buffered in the prefetch buffer from the storage controller to the host during a first time;
transmitting first normal data received from the non-volatile memory, instead of the prefetched data, from the storage controller to the host at a second time after the first time when a read performance of the prefetched data at the second time is greater than a threshold;
transmitting second normal data from the storage controller to the host when a read performance of the first normal data is greater than the threshold; and
transmitting a second part of the prefetched data from the storage controller to the host when the read performance of the first normal data is less than or equal to the threshold.

* * * * *